US012174935B2

(12) United States Patent
Chen et al.

(10) Patent No.: US 12,174,935 B2
(45) Date of Patent: Dec. 24, 2024

(54) METHOD AND SYSTEM FOR INTEROPERABLE IDENTITY AND INTEROPERABLE CREDENTIALS

(71) Applicant: DrFirst.com, Inc., Rockville, MD (US)

(72) Inventors: James F. Chen, Naples, FL (US); Chen Qian, Vienna, VA (US); Zilong Tang, Rockville, MD (US); Eric Rosenfeld, Frederick, MD (US)

(73) Assignee: DrFirst.com, Inc., Rockville, MD (US)

( * ) Notice: Subject to any disclaimer, the term of this patent is extended or adjusted under 35 U.S.C. 154(b) by 602 days.

(21) Appl. No.: 16/947,389

(22) Filed: Jul. 30, 2020

(65) Prior Publication Data
US 2020/0356659 A1  Nov. 12, 2020

Related U.S. Application Data

(63) Continuation of application No. 16/231,244, filed on Dec. 21, 2018, now Pat. No. 10,783,237, which is a
(Continued)

(51) Int. Cl.
*G06F 21/45* (2013.01)
*G06F 21/31* (2013.01)
(Continued)

(52) U.S. Cl.
CPC ............. *G06F 21/45* (2013.01); *G06F 21/31* (2013.01); *G06F 21/46* (2013.01); *G06Q 10/00* (2013.01);
(Continued)

(58) Field of Classification Search
CPC .......... G06F 21/31; G06F 21/46; G06F 21/45; G06Q 10/00; G06Q 50/265; H04L 63/08; H04L 63/10; H04L 63/0884; H04L 67/32
See application file for complete search history.

(56) References Cited

U.S. PATENT DOCUMENTS 6,192,380 B1   2/2001 Light et al.
6,564,247 B1 * 5/2003 Todorov ................. G06Q 10/10
                                                          707/999.001
(Continued)

OTHER PUBLICATIONS

U.S. Appl. No. 16/231,244, filed Dec. 21, 2018, Allowed.
U.S. Appl. No. 15/807,363, filed Nov. 8, 2017, Granted.
U.S. Appl. No. 14/582,666, filed Dec. 24, 2014, Granted.

*Primary Examiner* — Khoi V Le
(74) *Attorney, Agent, or Firm* — Brake Hughes Bellermann LLP

(57) ABSTRACT

The present teaching relates to generating an identifier for a person. In one example, an actual name of the person is received. The identity of the person that is associated with the actual name of the person is proved at a pre-determined level of assurance (LOA) required by an identity management system. When the identity of the person has been proved, a peripheral name is solicited from the person. An identifier that includes the actual name and the peripheral name of the person is created. Whether the identifier is unique is determined. The steps of soliciting, creating, and determining are repeated until the identifier is unique. The peripheral name is associated with the person. The identifier is associated with the person.

20 Claims, 17 Drawing Sheets

Related U.S. Application Data continuation of application No. 15/807,363, filed on Nov. 8, 2017, now Pat. No. 10,162,960, which is a continuation of application No. 14/582,666, filed on Dec. 24, 2014, now Pat. No. 9,940,452.

(60) Provisional application No. 62/042,973, filed on Aug. 28, 2014.

(51) Int. Cl.
| | |
|---|---|
| *G06F 21/46* | (2013.01) |
| *G06Q 10/00* | (2023.01) |
| *G06Q 50/26* | (2012.01) |
| *H04L 9/40* | (2022.01) |
| *H04L 67/60* | (2022.01) |

(52) U.S. Cl.
CPC ....... *G06Q 50/265* (2013.01); *H04L 63/0421* (2013.01); *H04L 63/08* (2013.01); *H04L 63/0884* (2013.01); *H04L 63/10* (2013.01); *H04L 67/60* (2022.05); *G06F 2221/2117* (2013.01)

(56) References Cited

U.S. PATENT DOCUMENTS

| | | | |
|---|---|---|---|
| 7,441,263 B1* | 10/2008 | Bakshi | G06F 21/335 |
| | | | 709/225 |
| 7,761,500 B1 | 7/2010 | Eckert et al. | |
| 7,818,792 B2 | 10/2010 | Shamsaasef et al. | |
| 8,176,490 B1 | 5/2012 | Jackson | |
| 9,183,376 B2 | 11/2015 | Shinoda | |
| 9,961,070 B2 | 5/2018 | Tang | |
| 10,163,105 B1 | 12/2018 | Ziraknejad et al. | |
| 2003/0115142 A1 | 6/2003 | Brickell et al. | |
| 2006/0129816 A1* | 6/2006 | Hinton | H04L 63/0815 |
| | | | 713/169 |
| 2007/0156601 A1* | 7/2007 | Brew | G06F 21/10 |
| | | | 705/57 |
| 2007/0174454 A1 | 7/2007 | Mitchell et al. | |
| 2007/0294399 A1 | 12/2007 | Grossner et al. | |
| 2008/0066067 A1 | 3/2008 | Stimpson et al. | |
| 2008/0270612 A1 | 10/2008 | Malakapalli et al. | |
| 2009/0019534 A1 | 1/2009 | Bakshi et al. | |
| 2009/0055642 A1 | 2/2009 | Myers et al. | |
| 2009/0064307 A1 | 3/2009 | Holar et al. | |
| 2009/0122979 A1* | 5/2009 | Lee | G06F 21/32 |
| | | | 707/999.006 |
| 2009/0249439 A1 | 10/2009 | Olden et al. | |
| 2009/0328196 A1 | 12/2009 | Bovee | |
| 2011/0014897 A1* | 1/2011 | Finucan | G06Q 10/10 |
| | | | 455/412.2 |
| 2011/0078439 A1 | 3/2011 | Mao et al. | |
| 2011/0107408 A1* | 5/2011 | Blot-Lefevre | G06Q 10/10 |
| | | | 726/7 |
| 2011/0154443 A1 | 6/2011 | Thakur et al. | |
| 2011/0162046 A1 | 6/2011 | Forster et al. | |
| 2011/0231280 A1* | 9/2011 | Farah | G06Q 40/12 |
| | | | 705/26.8 |
| 2011/0270909 A1* | 11/2011 | Fu | H04L 67/306 |
| | | | 709/203 |
| 2012/0041889 A1* | 2/2012 | Morrison | G06Q 10/105 |
| | | | 705/321 |
| 2012/0185398 A1 | 7/2012 | Weis et al. | |
| 2012/0227098 A1 | 9/2012 | Obasanjo et al. | |
| 2012/0272335 A1 | 10/2012 | Mahendrakar et al. | |
| 2013/0041678 A1 | 2/2013 | Tayal et al. | |
| 2013/0152183 A1 | 6/2013 | Plewnia et al. | |
| 2013/0191137 A1 | 7/2013 | Chen et al. | |
| 2013/0191138 A1 | 7/2013 | Chen et al. | |
| 2013/0191139 A1 | 7/2013 | Chen et al. | |
| 2013/0191898 A1 | 7/2013 | Kraft | |
| 2013/0246081 A1 | 9/2013 | Auer et al. | |
| 2013/0246082 A1 | 9/2013 | Brylawski et al. | |
| 2013/0311205 A1 | 11/2013 | Creswell et al. | |
| 2013/0336315 A1 | 12/2013 | Guichard et al. | |
| 2014/0173408 A1 | 6/2014 | Canaud et al. | |
| 2014/0244318 A1* | 8/2014 | Drake | G06Q 40/08 |
| | | | 705/4 |
| 2014/0310173 A1 | 10/2014 | Caldwell | |
| 2014/0344153 A1* | 11/2014 | Raj | G06Q 20/3821 |
| | | | 705/44 |
| 2015/0310176 A1 | 10/2015 | Chen et al. | |
| 2016/0055302 A1 | 2/2016 | Sellars | |
| 2016/0055313 A1 | 2/2016 | Sellars | |
| 2016/0063239 A1 | 3/2016 | Chen et al. | |
| 2016/0063657 A1 | 3/2016 | Chen et al. | |
| 2016/0065552 A1 | 3/2016 | Chen et al. | |
| 2016/0065579 A1 | 3/2016 | Chen et al. | |
| 2017/0177796 A1 | 6/2017 | Sellars | |
| 2017/0235890 A1 | 8/2017 | Chen et al. | |
| 2017/0346804 A1 | 11/2017 | Beecham | |
| 2018/0007059 A1 | 1/2018 | Innes et al. | |
| 2018/0181745 A1 | 6/2018 | Chen et al. | |
| 2018/0255049 A1 | 9/2018 | Tang | |

* cited by examiner

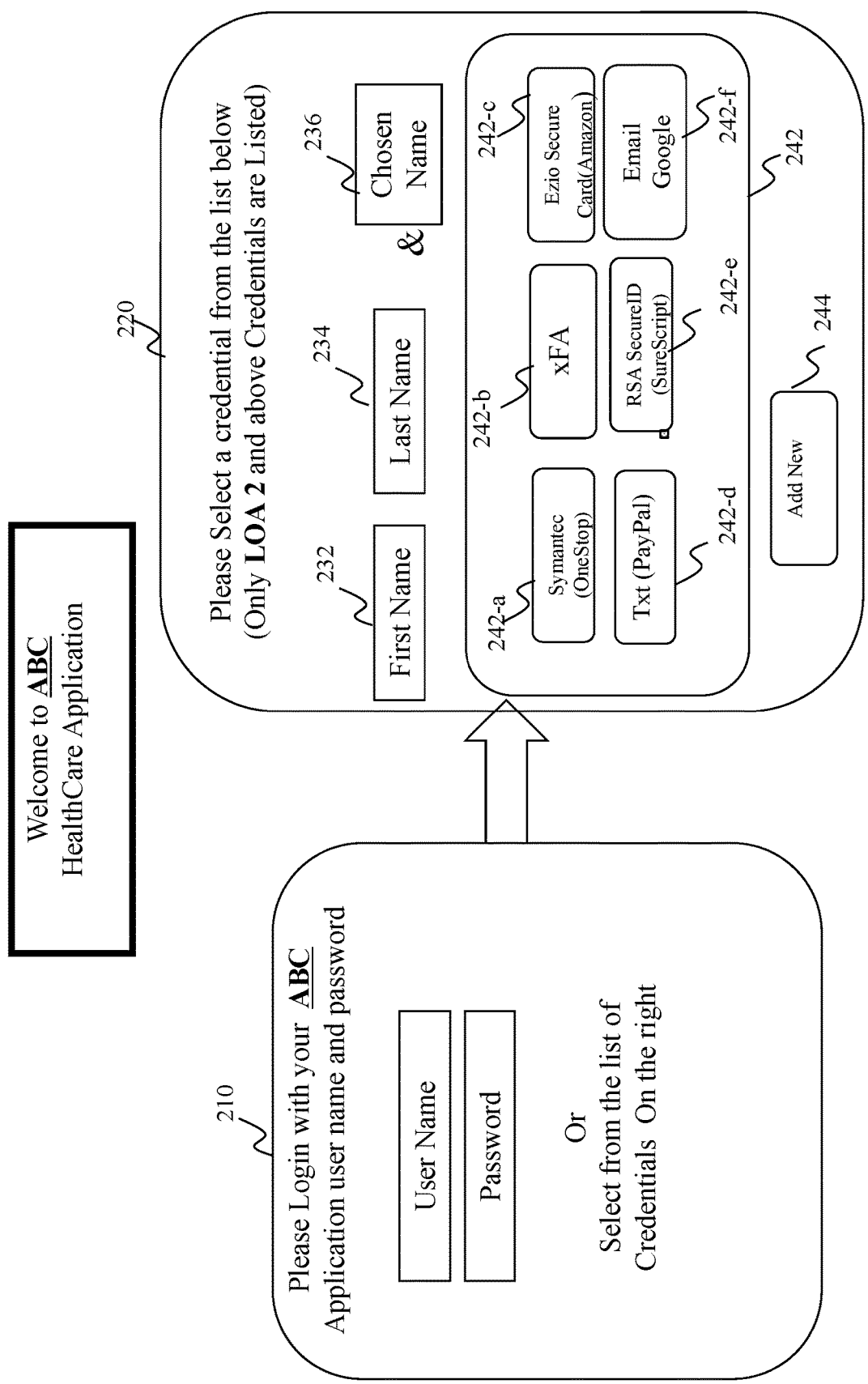
Fig. 2-a

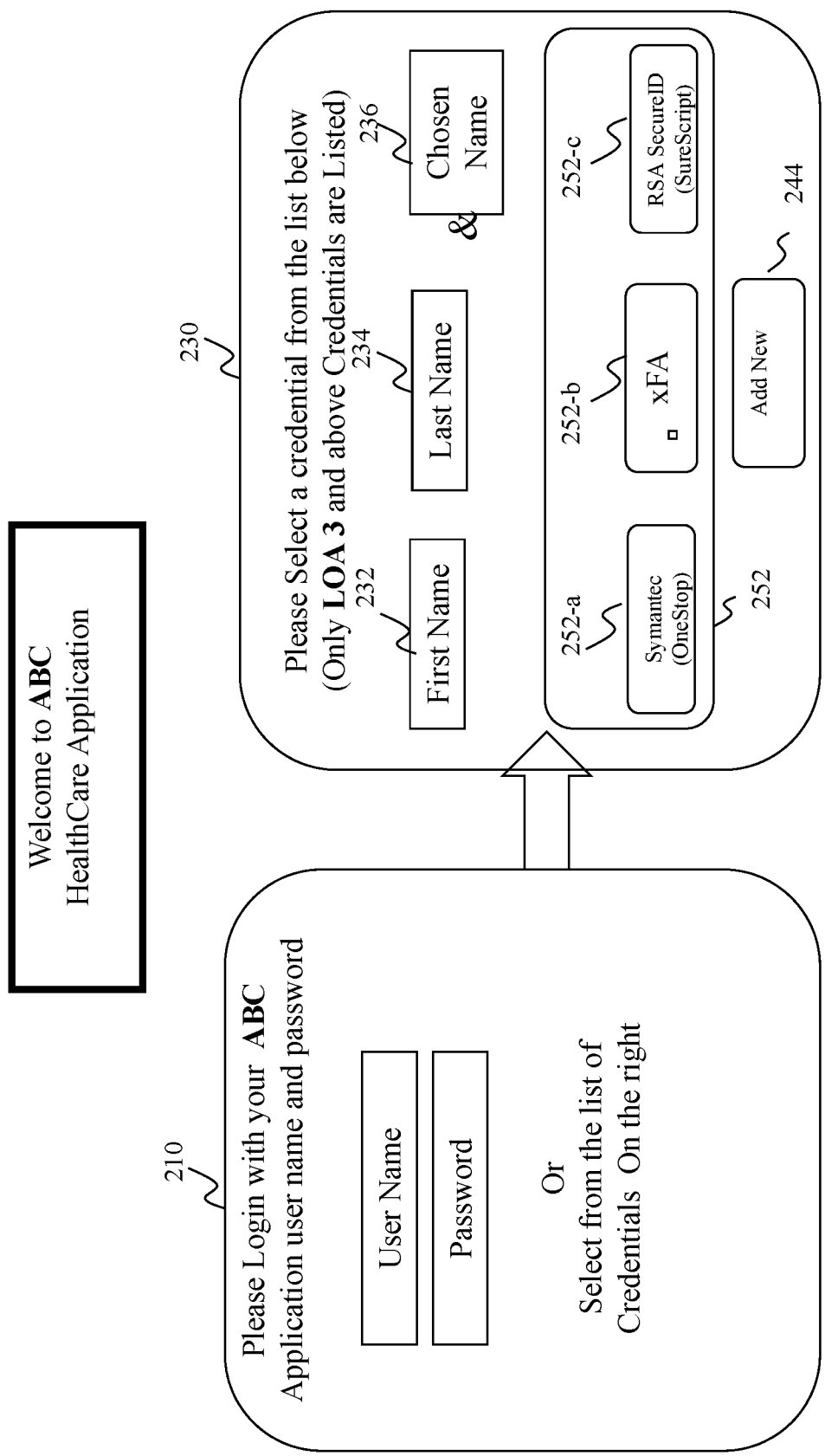
Fig. 2-b

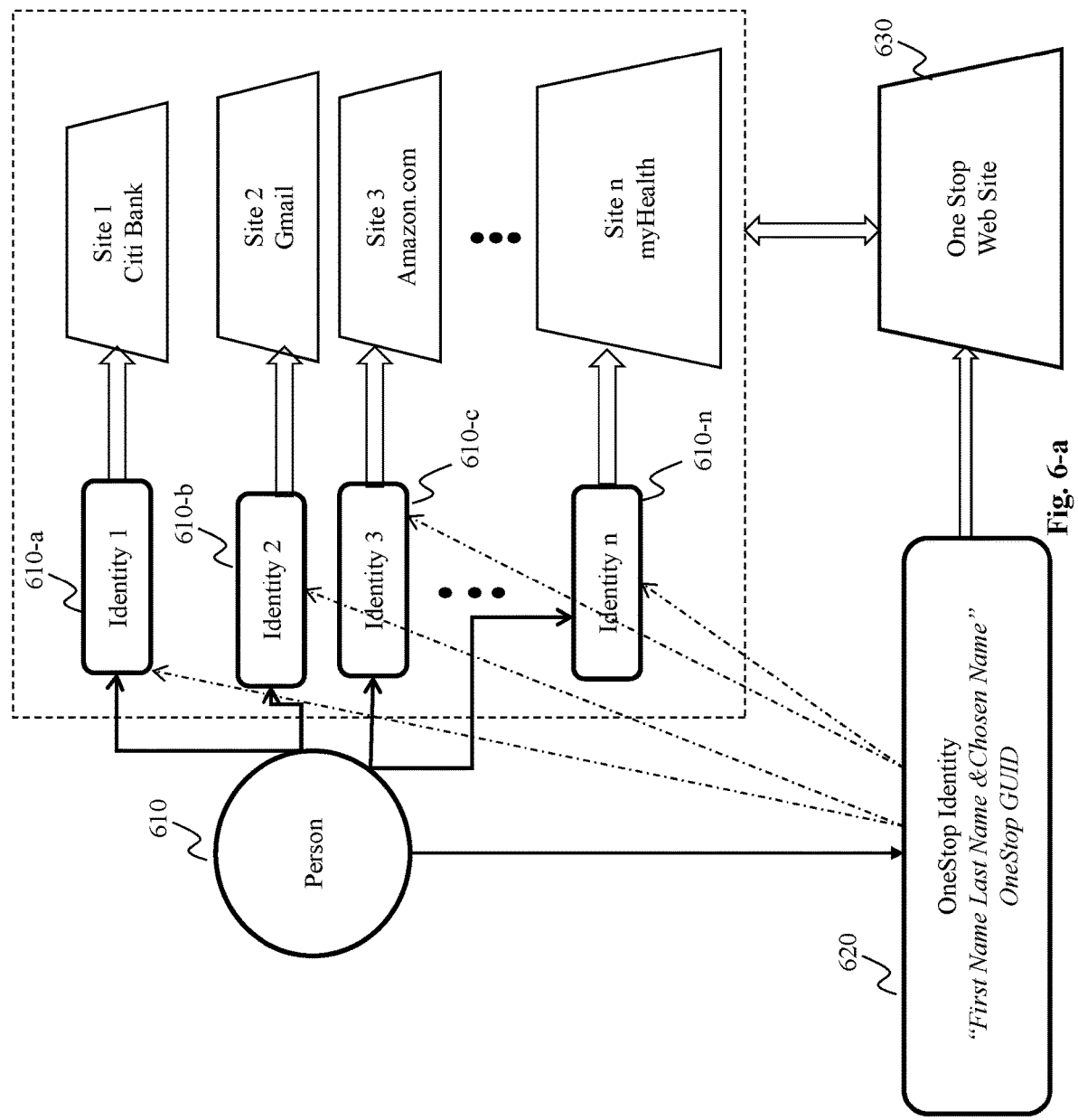
Fig. 6-a

| Identity Attribute Index | Attribute Name | Attribute Provider/Source | Attribute Consumer |
|---|---|---|---|
| 1 | Chosen Name | OneStop | None |
| 2 | First Name | OneStop | site 1, site 2, site 3, …. site n |
| 3 | Last Name | OneStop | site 1, site 2, site 3, …. site n |
| 4 | Date of Birth | OneStop | Site1 (citi bank) site n (myhealth.com) |
| 5 | Gender | OneStop | site 1, site 2, site 3, …. site n |
| 6 | Zip Code | OneStop | site 1, site 2, site 3, …. site n |
| 7 | Social Security number | OneStop IDP SSN Agent | site 1 (citi bank), site n (myhealth.com) |
| 8 | Place of birth | OneStop IDP Gov Agent | site 1 (citi bank) |
| 9 | US/foreign passport number | OneStop IDP Gov Agent | site x (travel.com) |
| 10 | Primary residence address | OneStop IDP Postal Office Agent | Site1 (citi bank), site 2 (gmail), site 3 (amazon.com)... site n (myhealth.com) |
| 11 | mailing address | OneStop IDP Postal Office Agent | site z (water delivery web site) |
| 12 | Primary e-mail address | OneStop | Site1 (citi bank), site 2 (gmail), site 3 (amazon.com)... site n (myhealth.com) |
| 13 | mobile phone number | OneStop | site 1, site 2, site 3, …. site n |
| 14 | Federal DEA Number | Site x (EPCS) | Site y (Rcopia) |
| 15 | NPI Number | Site y (Rcopia) | site x (EPCS) |

Fig. 6-b

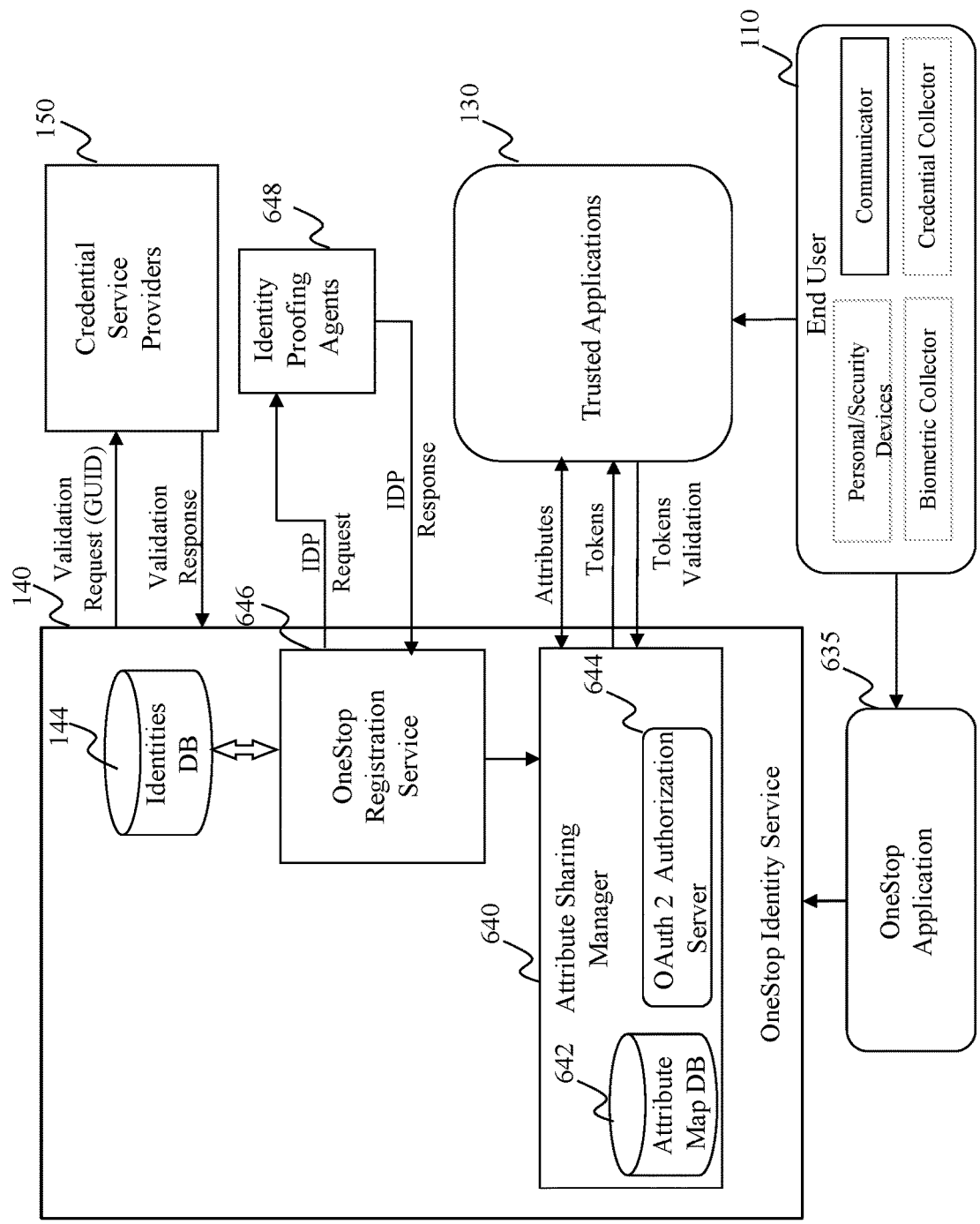
Fig. 6 –c

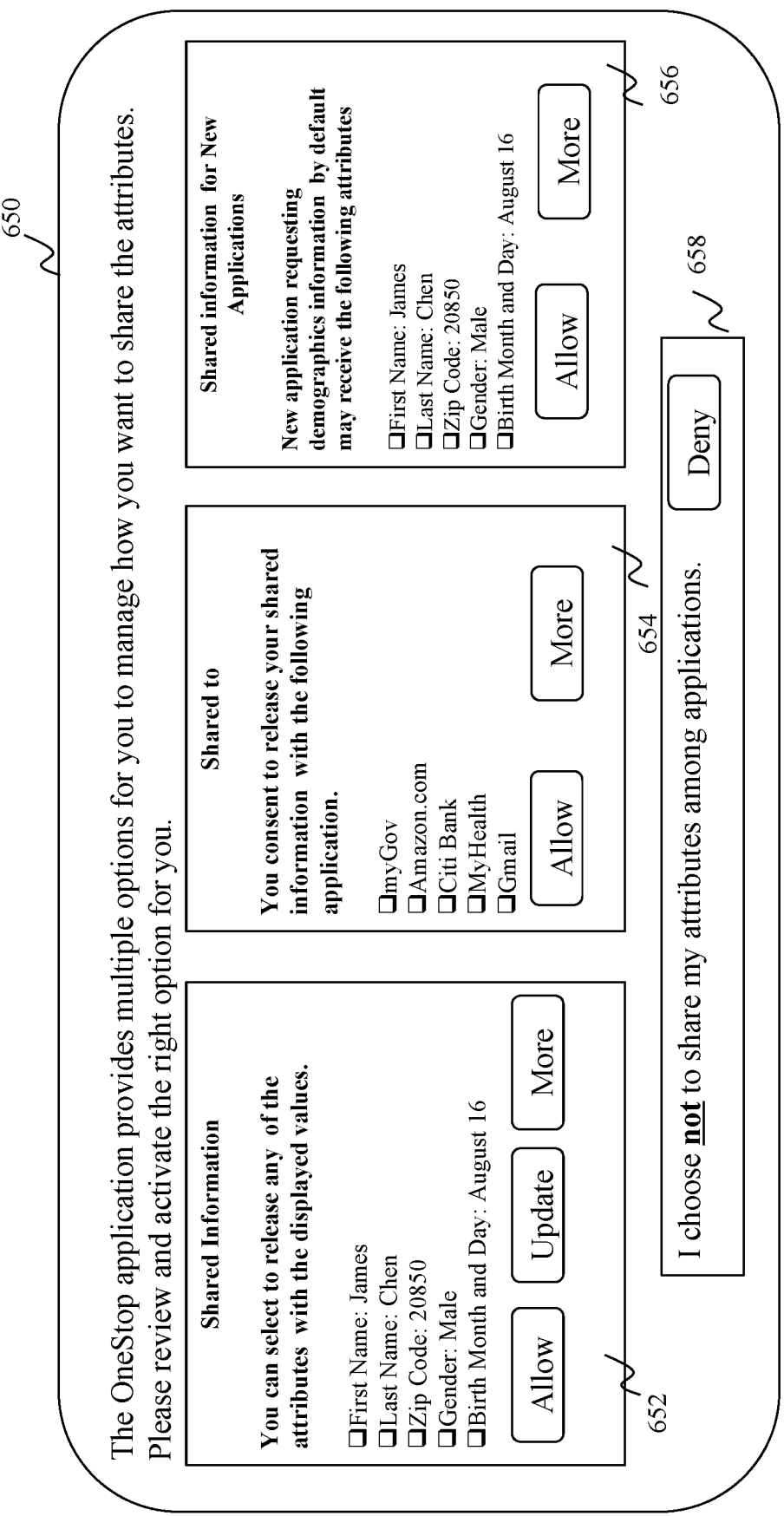
Fig. 6-d

METHOD AND SYSTEM FOR INTEROPERABLE IDENTITY AND INTEROPERABLE CREDENTIALS

CROSS-REFERENCE TO RELATED APPLICATIONS

The present application is a continuation of U.S. application Ser. No. 16/231,244, filed Dec. 21, 2018, which is a continuation of U.S. application Ser. No. 15/807,363, filed Nov. 8, 2017, which is a continuation of U.S. application Ser. No. 14/582,666, filed Dec. 24, 2014, which claims priority to U.S. Provisional Patent Application No. 62/042,973, filed on Aug. 28, 2014, all of which are incorporated herein by reference in their entirety.

BACKGROUND

1. Technical Field

The present teaching relates to methods, systems, and programming for identity management. Particularly, the present teaching is directed to methods, systems, and programming for computing measures to be used to provide interoperable identity among various service providers and to provide interoperable credentials.

2. Discussion of Technical Background

In the healthcare environment, online identity solutions that provide secure and interoperable identities are essential. Identity management technology provides management of identities in the digital world. In order to manage the growing number of online identities of a person or an entity, identity federation technology is developed so that different web-sites can reuse a single online identity.

A federated identity service provider provides user management and authentication services to a plurality of systems of different entities or web-sites, which are also called relying parties. A relying party, typically an application service provider, delegates to the identity service provider to authenticate an end user who is requesting access to the application service provider. As such, the relying party needs to trust the identity service provider to have correctly authenticated the requesting end user's identity.

An authentication process typically includes the process of verifying a credential the end user presents. In an electronic information system, a digital credential is issued to a legitimate user and will be used subsequently to authenticate the legitimate user. A classic example of a digital credential is a secret password, a passphrase or a pin number. Now, there is an increasing number of uses of other forms of digital credentials, such as, for example, biometrics (finger prints, voice recognition, retinal scans etc.), hard tokens, security devices, public key certificates, etc.

To objectively assess the quality of an authentication result, NIST document 800-63-1 defines a number of levels of assurance (LOAs) which describe the degree to which a relying party can be assured that the credential being presented actually represents the entity named in it and that it is the represented entity who is actually interacting with the relying party.

LOAs are based on two factors: (1) how much can a digital credential be trusted to actually belong to a person. This factor is generally handled by identity proofing; (2) how much the digital credential can be trusted to be a proxy for the entity named in it and not someone else, i.e. identity binding. This factor is directly related to the trustworthiness of the credential technology, the processes by which the digital credential is secured to a token, the trustworthiness of the system that manages the credential and token, and the system available to validate the credential or the token.

SUMMARY

The teachings disclosed herein relate to methods, systems, and programming for providing identity management and authentication services. More particularly, the present teaching relates to methods, systems, and programming to provide interoperable identity services for various services providers and to enable interoperability of credentials during the authentication process.

In one example, a method, implemented on at least one computing device having at least one processor, storage, and a communication platform connected to a network for generating an identifier for a person is disclosed. An actual name of the person is received. The identity of the person that is associated with the actual name of the person is proved at a pre-determined level of assurance (LOA) required by an identity management system. When the identity of the person has been proved, a peripheral name is solicited from the person. An identifier that includes the actual name and the peripheral name of the person is created. Whether the identifier is unique is determined. The steps of soliciting, creating, and determining are repeated until the identifier is unique. The peripheral name is associated with the person. The identifier is associated with the person.

Other concepts relate to software for implementing the present teaching on interoperable identities and interoperable credentials. A software product, in accord with this concept, includes at least one non-transitory machine-readable medium and information carried by the medium. The information carried by the medium may be executable program code data regarding parameters in association with a request or operational parameters, such as information related to a user, a request, or a social group, etc.

In one example, a non-transitory machine-readable medium having information recorded thereon for generating an identifier for a person is disclosed. The recorded information, when read by the machine, causes the machine to perform a series of processes. An actual name of the person is received. The identity of the person that is associated with the actual name of the person is proved at a pre-determined level of assurance (LOA) required by an identity management system. When the identity of the person has been proved, a peripheral name is solicited from the person. An identifier that includes the actual name and the peripheral name of the person is created. Whether the identifier is unique is determined. The steps of soliciting, creating, and determining are repeated until the identifier is unique. The peripheral name is associated with the person. The identifier is associated with the person.

Additional features will be set forth in part in the description which follows, and in part will become apparent to those skilled in the art upon examination of the following and the accompanying drawings or may be learned by production or operation of the examples. The features of the present teachings may be realized and attained by practice or use of various aspects of the methodologies, instrumentalities and combinations set forth in the detailed examples discussed below.

BRIEF DESCRIPTION OF THE DRAWINGS

The methods, systems, and/or programming described herein are further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 2-a shows an exemplary user interface for a LOA2 application in which an end user may login via a LOA2 credential through OneStop identity center, according to an embodiment of the present teaching;

FIG. 2-b shows an exemplary user interface for a LOA3 application in which an end user may login via a LOA3 credential through OneStop identity center, according to an embodiment of the present teaching;

FIG. 6-a shows a conceptual view of an exemplary role of OneStop identity center in managing a person's various online identities, according to an embodiment of the present teaching;

FIG. 6-b shows portions of data used in an exemplary attribute management feature of OneStop identity center, according to an embodiment of the present teaching;

FIG. 6-c shows exemplary system diagrams of OneStop identity center that includes the attribute sharing feature, according to an embodiment of the present teaching;

FIG. 6-d shows an exemplary user interface of OneStop identity center where the user manages attribute sharing among various trusted applications, according to an embodiment of the present teaching;

DETAILED DESCRIPTION

Figure 1:
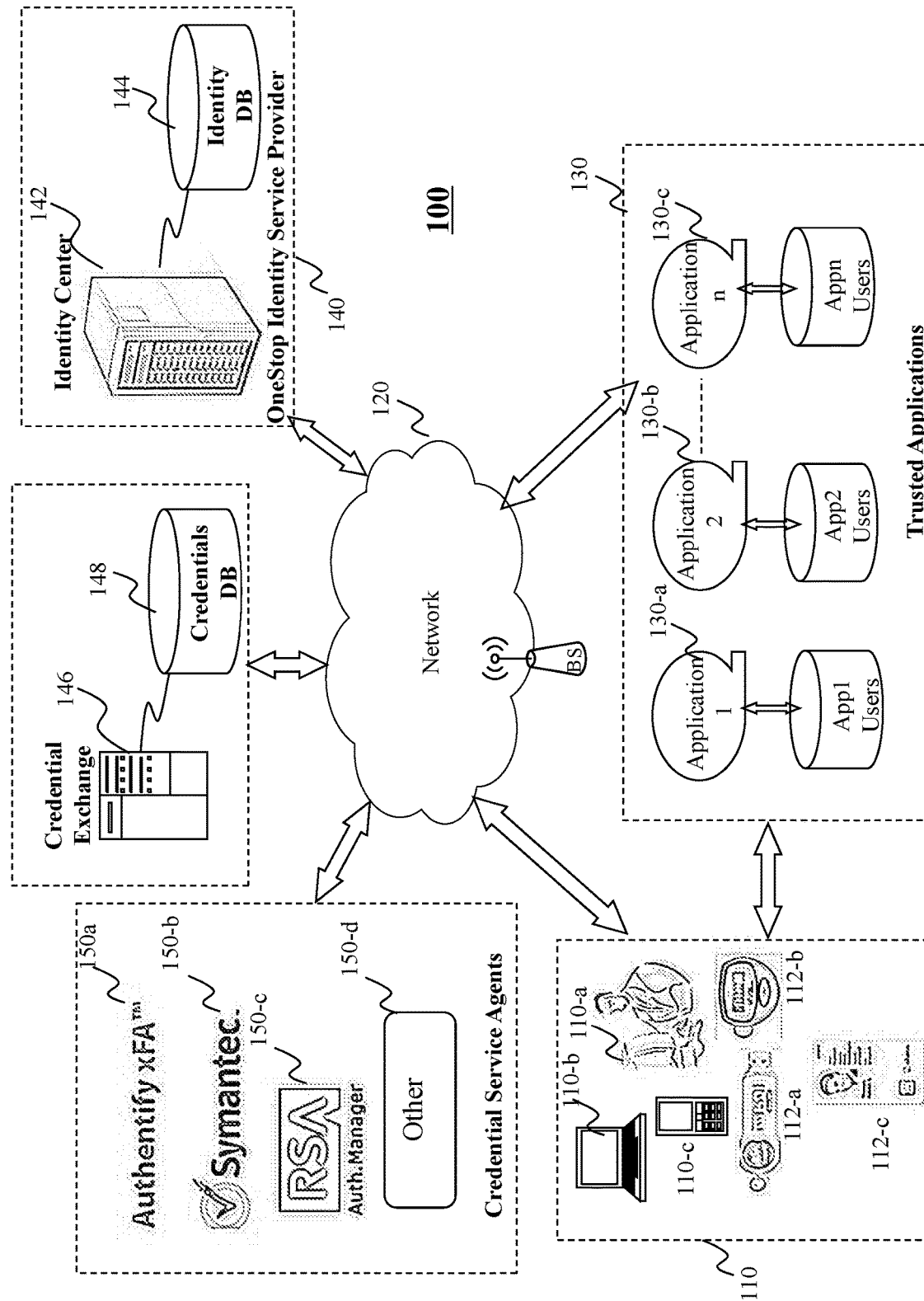
FIG. 1 is a high level depiction of an exemplary system configuration of the present teaching, according to an embodiment of the present teaching.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, systems, components, and/or circuitry have been described at a relatively high-level, without detail, in order to avoid unnecessarily obscuring aspects of the present teachings.

The present disclosure describes method, system, and programming aspects of methods and systems for providing a centralized identity management and authentication services to a plurality of trusted applications or service providers. The method and system of the present teaching are realized as a specialized and networked system by utilizing one or more computing devices (e.g., mobile phone, personal computer, etc.) and network communications (wired or wireless). The objectives of the present teaching include, for example, providing centralized management of identity information in a trusted framework, using a portable, easy to use chosen name to create a unique identifier to universally identify a person, enabling interoperable credentials and allowing individuals to reuse already obtained credentials, protecting the privacy of personal information (identity attributes and other identity information) by separating it from the authentication process. For example, using anonymous digital credentials that do not contain personal information such as the person's name, birth place, birth date, or biometric information such as a picture or a finger print.

Moreover, the method and system disclosed in the present teaching can protect the privacy of personal information by providing a multi-stage look up mechanism, so that there is no direct access to a person's identity information without successful authentication. The binding of the identity and the digital credential provides additional protection to the identity information.

A credential manifests a person's relationship to an entity. Even though the relationship is established first by verification of identity information—the identity proofing process. The established relationship is embodied in an anonymous digital credential that no longer includes identity information. As a result, authentication of an identity no longer requires identity information. Rather, authentication becomes a separate process to verify an anonymous digital credential. Further, the frequency of the authentication process does not compromise privacy.

NIST document 800-63-1 defines four levels of assurances (LOAs), as well as the protocols for and practices used for each level. In the present teaching, the identity service provider is designed to comply with these protocols and practices in its use of LOAs both in the process of identity proofing, credential management and end user authentication.

The identity provider may be validated by a third party. The identity provider may also belong to a trusted frame work that serves a community of relying parties. In the present teaching, an identity service request to the identity service provider includes both an identity assertion and the level of assurance for the identity assertion. For example, as seen below, US federal government may establish a trust framework to ensure secure transactions between a citizen and business online services.

1. Centralized Identity Management

An identity is a set of attributes related to an entity. The identity of a human entity, such as a person, is recognized by one or many attributes of the person, such as, for example, attributes that the person have provided to various social entities, where by the social entities may have, for example, recorded the person's attributes in their information systems.

In one example, a person's identity may include physical attributes such as height, weight, hair color, eye color, etc. These attributes may be used for a driver license issuing authority. These attributes may be accessible through an application or web site of the driver license issuing authority.

In another example, the person's identity may include attributes such as date of birth, gender, and place of birth. These attributes may, for example, be recorded at the person's birth certificate and accessible by a computerized system or web site of the person's birth certificate issuing authority. These attributes may be referenced, for example, by US Department of the State's information system when the person uses these attributes to apply for a US passport.

With time, the person's identity grows since the person interacts with more and more social entities through life and as a result acquires more and more identity attributes with respect to each of the social entities. With the prevalence of information technology, frequently, the social entities maintain the person's identity attributes and make them accessible through a computerized system or web site. For example, the person enters the education system and may acquire attributes such as a student id from the college he is attending. The person may also acquire a student email account. Both the student id and the student email account attributes are accessible through an application or web site of the person's college information system.

Similarly, when the person is employed, the person may acquire an employee id attribute from the person's employer whereby the person would be recognized by in the person's employer information system. In still another example, the person may acquire attributes in his professional fields and being recognized by specific professional organizations: a doctor may have a National Provider Identifier (NPI number) attribute as issued by the Centers for Medicare and Medicaid Services (CMS); a lawyer may acquire an attribute of a state bar license number for the state that he is licensed to practices law.

In another example, the person may interact with entities in the financial industry, such as banks, credit card companies, mortgage companies. The person acquires additional attributes such as bank account numbers, credit card numbers, and mortgage account numbers within these entities.

Similarly, when the person interacts with service providers such as a phone service provider, the person may acquire a mobile phone number, or a land phone number attribute. When the person subscribes to cable service, internet service, water, gas, electricity service, newspaper service, the person may also have acquired attributes such as an account number from each of these services.

Moreover, when the person interacts with various online service providers; social media service providers, online shopping service providers, communication service providers, data storage service providers, and digital entertainment service providers, etc. The person may acquire attributes such as, for example, a number of email accounts, twitter accounts, a Facebook accounts, an aliased account on an online chat forum, etc.

In still another example, the person may interact with entities in the health care industry, and acquires attributes from the interacting healthcare entities. For example, the person may acquire a patient ID x from hospital A's system when, for example, the person went to hospital A's emergency care facility after an accidental fall from the stairs. The person may acquire a different patient ID y from hospital B's system when the person went to hospital B for cardiovascular care.

In summary, a person's identity, i.e., the various attributes that relate to the person are fragmented and distributed in a vast number of computer systems of different social entities and services providers.

Problems exist for such distributed identity configuration. For example, some of these attributes are common among many entities; as a result these attributes are duplicated in multiple copies in multiple entities. For example, the "current address" attribute may be exist in many entities, such as, for example, the person's bank, the person's credit card company, the person's account in Amazon.com, the person's employer, the person's primary care doctor's practice, the person's record with the DMV, the person's record with the state bar association, etc.

The repetitive nature of these attributes creates two problems. First, it is burdensome for a person to repeatedly provide this information to every entity that requires it. Second, it becomes burdensome for the person to update changes to such attributes, and manually update every copy of the same attributes. For example, when the person moves to a new address, the new "current address" attribute need to be updated to all the entities, such as the entities listed above.

The present teaching provides a solution to the above problems. The present teaching enables the person to have centralized control over the person's identity attributes and their uses in various entities as it provides secure exchange of identity information among a wide group of identities while reducing risk. For example, the present teaching enables identity attributes be distributed to or shared among trusted entities so as to reduce duplicate copies of the same attributes in different entities. Having centralized control over decentralized data storage provides efficiency without sacrificing data privacy.

2. Universal Identifier

As seen in the examples above, the person's identity is distributed in multiple entities, with each entity maintaining a subset of the person's identity attributes, as well as some other information with respect to the person. For example, the college the person attended may maintain the person's identity attributes, such as student ID, student email account. The University may also keep other information about the person, such as, for example, the person's enrolling period, degree earned, date of the degree earned, permanent address of record, etc. These other attributes may also be used to identify a student if the student id is being reused, for example, after 20 years.

In another example, at birth, the person builds a connection to his birth country's government by establishing a "legal name" identifier to the government, for example, by applying for a birth certificate to prove this connection. The government may also record the other attributes, such as the person's gender, date of birth, place of birth, parents' names, etc. When two person have the same legal name, the person's other attributes may be used to distinguish them.

Within the universe of each entity, the person may be associated with an identifier that uniquely identifies the person within that particular entity. For example, a social security number can be an identifier to uniquely identify the person for the US federal government; a driver license number can be an identifier to uniquely identify the person in the person's residential state; a student id can be an identifier to uniquely identify the person in the person's university; a bank account number can be an identifier to uniquely identify the person in the bank.

In still another example, a lawyer's state bar license number is a unique identifier to identity the lawyer in that state bar association. In still another example, a doctor's National Provider Number (NPI number) is a unique identifier to identify the doctor in the healthcare system.

These identifier attributes are important personal identification numbers. However, these numbers are randomly generated before being assigned to a person, and thus, are not easy to remember. These numbers may be presented in the form of ID cards, such as a social security cards, driver license, bar license cards, etc. However, managing these extra ID cards or id numbers can be burdensome. It also causes security problems when such ID cards are lost or stolen.

The present teaching teaches a method for creating a consistent identifier that can be used universally across all trusted entities, thus reducing the need to manage multiple identifiers. More specifically, the present teaching provides a Chosen Name identifier, a name that the person chooses for himself/herself, a name that the person prefer to be called despite his real name.

The present teaching also enables secure exchange of user identity information between OneStop and the trusted entities under the user's consent. A trusted entity may require a specific set of identity attributes to map an OneStop identity to a user account of the trusted entity. For example, a personal healthcare record system (PHI) requires 5 identity attributes to find a user's account: first name, last name, date of birth, gender and zip code. Upon user's consent as presented, for example, through an OneStop user interface, OneStop may share these 5 attributes of the user with the PHI system, for example, in an OpenID Connect ID token, along with the user's GUID in the OneStop system.

On the other hand, a user may apply for an OneStop account via a trusted application. In other words, the trusted application may act as an identity proofing agent for OneStop.

For example, the person may consent to the PHI system to provide the 5 identity attributes, such as first name, last name, date of birth, gender and zip code to OneStop, PHI system may also provide the LOA based on its record of the user's identity proofing in the PHI system. In one embodiment of the present teaching, using the OpenID Connect protocol (http://openid.net/connect/faq/), PHI system may serve as UserInfo endpoint for OneStop, so that OneStop may obtain the 5 needed attributes and the LOA level securely from the PHI system. The OpenID Connect protocol include ID token, which include information about the authenticated user. The UserInfo endpoint in the OpenID Connect protocol gets attributes about the user and translates the ID tokens.

3. Chosen Name: A Universal Personal Identifier

The present teaching may use a globally unique personal identifier for every user of the OneStop identity center.

The identifier includes the actual name of the person and a peripheral name from the person. The actual name may include a first name, a middle name, and/or a last name of the person. The actual name may be the name appeared on the official ID, e.g., passport, of the person issued by a government. Depending on the nationality of the person, the actual name may be in any language, such as for example, English, Spanish, German, French, Italian, Chinese, Japanese, Korean, etc. The peripheral name may be any name other than the person's actual name, for example, a name chosen by the person (chosen name). The peripheral name may be in one or more language, such as for example, English, Spanish, German, French, Italian, Chinese, Japanese, Korean, etc. In one example, the entire peripheral name is in the same language. In another example, part of the peripheral name is in one language, while other part(s) of the peripheral name are in different language(s). The identifier may further include a symbol, such as but not limited to, "+," ";," "%," "@," "~," "#," "^," "&," and "*." The number of the symbol(s) is not limited to 1, and can be any number, such as 2, 3, or more. The symbol may connect the actual name and the peripheral name.

Figure 13:
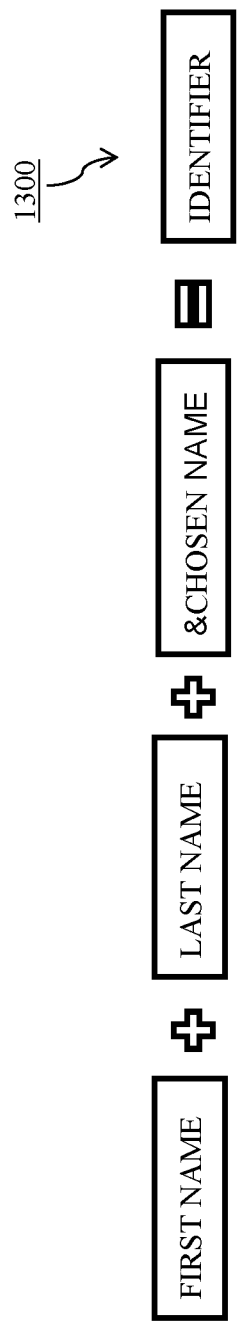
FIG. 13 depicts example elements used to generate a universal personal identifier, according to an embodiment.

In one embodiment, the identifier includes a person's first name, last name, a "&", and the person's chosen name. For example, Mr. James Chen decides that he would like "Tiger" to be his chosen name; his identifier in OneStop would be "James Chen &Tiger." In another example, suppose the fictitious figure, Mr. James Bond decides that he would like be called "007", and use it as his chosen name, his identifier in OneStop would be "James Bond &007." FIG. 13 illustrates example elements used to generate a globally unique identifier 1300.

201A person's full name is the person's most significant social identifier, which includes at least a first name and a last name. However, traditionally neither the first name nor the last name is of the person's own choice: the first name is chosen, normally, by the person's parents; the last name is given, normally, by the person's family, either through birth or by marriage.

A chosen name is a name that the person prefers to be called despite his actual name. The underlying philosophy of the chosen name is to provide a person with an opportunity to choose a name for himself/herself, a name that he can expresses himself as who he is, to reflect his preference and follow his own desire as how he/she should be recognized. Because the chosen name is centered on the person's own belief and created with his own unique expression as to his/her identity. As such, the chosen name would be easy to remember and promotes user's frequent use.

Due to the human factors of the chosen name design as discussed above, it is the vision of the present teaching to have chosen name build its weight with time, through frequent, consistent use, gaining universal acceptance in all aspects of the person's online interactions, and thus becoming a part of the person's permanent identity.

As part of an online identity identifier, a chosen name may be implemented using as a string. The string includes a sequence of characters, and has an arbitrary but finite length. In one embodiment of the present teaching, the characters may include all alphabetic letters. In one embodiment of the present teaching, the characters may include all characters in the Chinese language. Similarly, in other embodiments of the present teaching, the set of valid characters may include all characters in the Japanese language, or Russian language, or Arabic language, or any other written language.

In another embodiment of the present teaching, the characters may include all Arabic numerals. In another embodiment of the present teaching, the characters may include both alphabetic letters and Arabic numerals numbers.

To ensure the uniqueness of each globally universal identifier, and tolerate user input errors, the present teaching may use a threshold value between the distances between any two global identifier strings. For example, the distance between an identifier "Jim Chen &Tiger" and "James Chen &Tiger" may be too short to distinguish each other. Common typos, such as skipping a letter, reverse letters, double letters, may also create a string that has too short of a distance to the correct spelling of the intended identifier.

In one embodiment of the present teaching, the Jaro-Winkler distance, measures the distance. The higher the Jaro-Winkler distance for two strings is, the more similar the strings are. The Jaro-Winkler distance metric is designed and best suited for short strings such as person names. The score is normalized such that 0 equates to no similarity and 1 is an exact match.

In another embodiment of the present teaching, the distance is measured by the Levenshtein distance. The Levenshtein distance between two strings is defined as the minimum number of edits needed to transform one string into the other, with the allowable edit operations being insertion, deletion, or substitution of a single character. Other embodiments may apply different string distance algorithms, including but not limited to Euclidean Distance, Cosine/Sine similarity distance, Chapman Length, Soundex, Linear and Non-linear clustering, as well as string distance algorithms that are tailored to a particular language.

In still another embodiment, the distance is created by a machine learning algorithm, where user input errors are captured and such errors are used as feedback to correct the outcome of the distance algorithm.

4. Multi-Credential Authentication

In the present teaching, one purpose of a digital credential is to prove to a digital system that the presenter of the digital credential is the very person/identity that is associated with the digital credential. In other words, a digital credential serves as a proxy of the identity/person to the digital system. The process to authenticate an identity/person to a digital system becomes the verification of the proxy, i.e., the digital credential. As such, an identity can be asserted digitally via verification of the digital credential.

Examples of a digital credential may include something that the person can remember, such as a password. A digital credential may also include something that the person carries, such as his mobile phone, a smart card, a hard token or a USB device. A digital credential may also include something that the person is, such as, for example, a person's biometrics: voice, finger prints, iris scans, etc.

A person may have established a number of digital credentials during the person's interactions to various entities. For example, the person may have obtained a smart card from the person's employer, the person may be obtained a Symantec hard token as a doctor to electronically prescribe controlled substances to patients, the person may acquire a RSA security token from the hospital system that the person works for.

Using a digital credential makes it easy to use and secure. Because the credential is secured to a token, the trustworthiness of the system that manages the credential and token, and the system available to validate the credential.

Digital credentials are issued to a person and become attached to the person. Presenting the correct digital credential as linked to the identifier enables the information system to trust the current user being the legitimate user. In other words, an identity can be asserted by authentication of the digital credential.

In the present teaching, authentication may be a process to electronically verify an assigned credential of an identity as means to accept an identity assertion of that identity.

For the same security reasons, the person may have gone through a through identity proof process before being issued the digital credential. The person is further burdened to manage an increasing number of such security devices, each for a particular entity, even though they serve the same purpose.

The present teaching allows reuse of the collection of the existing credentials the person has acquired from various entities. The present teaching also manages security and trust among these established credentials so that they can be used in other entities, based on standards as set forth in NIST document 800-63-1. The present teaching further enables compound credentials, where more than one credentials are used together for increased security. The present teaching provides security because it does not expose links or look up mechanism for identity attributes.

Motivated by this challenge, the teachings presented herein provide a system or service that utilizes improved approaches to a centralized identity management system which manages the identity attributes that are collected from various source entities.

FIG. 1 is a high level depiction of system configuration in which a centralized identity management system manages the identities and end user authentications for a number of trusted entities, according to an embodiment of the present teaching. To provide a context, an example of the use of the system is described below. The end user 110 may desire to access a trusted application 130 to obtain contents or services as provided by application service providers for the trusted application 130.

In accordance with the present teaching, the OneStop identity service provider 140 performs a 3 step process: (1) identity searching; (2) credential selection; and (3) credential verification. In step (1) Identity searching: the identity center 142 may first search for the identity with identifiers provided by the end user. The identity center 142 then determines whether the end user 110 has sufficient level of assurance (LOA) with its identity proofing record, as indicated in the identity database 144. The identity center 142 may provide additional identity proofing to the end user 110 if needed to reach the desired LOA.

In step (2) credential selection: the identity center 142 may search for the credentials options of the end user 110 via communicating with a credential exchange 146. The credential exchange 146 may generate available credential options that are at or above the desired LOAs by looking up in the credential database 148. The credential database 148 includes credential information that the end user 110 may have.

In response, the end user 110 may select one particular credential to authenticate him/her. In step (3) credential verification: based on the selected credential, the credential exchange 146 selects the corresponding credential service agent 150 to verify the selected credential by interacting the end user 110. Finally, upon successful verification of a valid credential, the identity center 142 provides a timed digital identity token to the requesting trusted application 130 for the end user 110.

In FIG. 1, the exemplary system 100 includes an end user 110, a network 120, a number of trusted applications 130, including application 1 130-*a*, application 2 130-*b*, application n 130-*c*, an identity center 142, an identity database 144, a credential exchange 146, a credentials database 148, a number of credential service agents 150, including Authentify xFA 150-*a*, Symantec 150-*b*, RSA 150-*c*, Federal PKI Bridge (for PIV card), Verizon, and other credential service agent 150-*d*.

The network 120 can be a single network or a combination of different networks. For example, a network can be a local area network (LAN), a wide area network (WAN), a public network, a private network, a proprietary network, a Public Telephone Switched Network (PSTN), the Internet, a wireless network, a virtual network, or any combination thereof. A network may also include various network access points, e.g., wired or wireless access points such as base stations or Internet exchange points, through which a data source may connect to the network in order to transmit information via the network.

The end user 110 may connect to the network via desktop connections (110-a), or connect to the network via wireless connections such as through a laptop (110-b), or a handheld device (110-c). The end user 110 may have number of authentication tokens for the specific purpose of authenticating himself/herself to access online applications or perform electronic transactions. The end user 110 may carry a hard token 112-b, such as, for example a Symantec hard token that generates codes those changes with time. Then end user 110 may also have a USB token 112-a, such as, for example a RSA Secure ID token. The end user 110 may also have a smart card 112-c, such as, for example, an identification card issued by the end user's employer.

The trusted application 130 includes a number of trusted applications in a trust framework. The trust framework may be established by contracts among all member entities for each of the member applications 130, and the OneStop identity Service provider 140. The trust framework may also be established via certain certification program, where each member entity or each member applications are certified to be in compliance with a common security protocol. For example, for health information exchange purposes, member entities and applications may follow the LOA practices as defined in the NIST document 800-63-1. In another example, a trust framework may be established by the federal government, such as, U.S. Federal Identity, Credential, and Access Management (FICAM) Trust Framework Solutions (TFS) program (http://info.idmanagement.gov/2013/11/ficam-trust-framework-solutions-tfs.html).

The trusted application 130 may include different applications within one organization. For example, a doctor may access an electronic prescription application, a medical history application, and a HIPAA compliant secure email application, all within one hospital system where the doctor practices. The trusted application 130 many also include applications from different organizations. For example, a doctor may access an electronic prescription application from an application provided by a clinical network, the doctor may access a medical history application from an application provided by a health information exchange (HIE) network, and the doctor may access a HIPPA compliant secure email application hosted by a communications service provider.

In another example, a patient end user 110 may access a first application from hospital 1 to access his recent in-patient record. The patient may access a second application in hospital 2 to access his record for an emergency care. The patient may access an application in lab 3 to access his recent X-ray. The patient may access a fourth application from his/her insurance company for a medical claim.

Traditionally, a trusted application 130 handles its own identity proofing process. For example, upon the end user's initial registration to the trusted application 130, an end user 110 may be required to input, such as via entering into a form, his name, address, email address, phone number and other relevant information about the user. Upon receipt of the user information and verifying it successfully, (i.e., identity proofing of the end user 110), the application 130 may enable the end user 110 to create an account. The user account may be accessed by an identifier (e.g., a user name) and a digital credential (e.g., a password).

To access a trusted application 130, an end user 110 may need to register with the application 130. The registration process may require the end user 110 to provide sufficient information about the end user 110, for purpose of, for example, identity proofing the end user 110 at the desired LOA level of the application 130, as defined in the standards as set forth, for example, in NIST document 800-63-1. In one example, the application 130 may be a free newsletter application that delivers to the user news on selected topics. The newsletter application may require a LOA1 level of identity proofing, where the end user 110 only need to provide a unique identifier and a personal email address.

In another example, the application 130 provides online shopping services, and requires a LOA2 level of identity proofing. In this online shopping application, the end user 110 may need to additionally provide his bank account information, or his credit card information, for example, via the registration interface of the online shopping application. The end user 110's user account will be created only after the application 130, here the online shopping application, has verified and proved accurate of the person's bank account or the credit card account information. In another example, the application 130 is an application for accessing to a restricted system that is subject to is subject to regulatory requirements (e.g. HIPAA, DEA rules, etc.).

For example, the application 130 may be an electronic prescription application for doctors to prescribe controlled substances (EPCS application), where the end user 110 (e.g., a doctor) is required to pass at least a LOA3 of identity proofing before enabled to create account in the EPCS application. In one implementation of the EPCS application, the end user 110 is required to pass a vigorous identity proofing process through the hospital system, where the end user 110/doctor is required to be present in person, to the registration staff of the hospital, showing two forms of government issued picture ID which shows the doctors legal name, nationality, address and date of birth. In another example of an EPCS application, the end user 110/doctor is required to respond to a letter that is mailed to him/her at his/her primary address. In still another example, the end user 110/doctor is required to answer, via a landline telephone from his home, various questions to prove his/her identity.

In still another example, the application 130 is a credential issuing application where a user is issued a credential based on sufficient identity proofing at a particular LOA level. For example, the application 130 may be a Symantec application, where the user is issued a hard token upon successful identity proofing, for example, at LOA2. The application 130 may be a RSA application, where a user is issued RSA security token upon successful identity proofing, for example, at LOA2.

In still another example, the application 130 includes an OneStop application where an end user 110 may go through the identity proofing process through the identity proofing process of the OneStop identity center 142 and being issued a credential by the OneStop identity center 142.

OneStop identity service provider 140 is an identity management system that provides identity services for the trusted applications 130. OneStop identity service provider 140 includes an identity center 142 and an identity database 144. In some embodiments, the OneStop identity service provider 140 may also include the credential exchange 146 and the credentials database 148.

In one embodiment of the present teaching, the OneStop identity service provider 140 may engage identity proof agent, such as, for example, Google, PayPal, Equifax, Facebook, Twitter, LinkedIn, Microsoft to conduct the identity proofing process.

In another embodiment of the present teaching, the OneStop identity service provider may contact with other identity providers, such as, for example, to initially create OneStop users based on records from the US department of State, Department of Homeland Security, Veterans Administration Office of Personnel Management, CAQH, MyGov (General Service Administration), various State Department of Motor Vehicles, or Notary Services.

The identity database 144 includes identity information for each OneStop user, including various identity attributes, identity proofing record, and identity binding records.

In one embodiment of the present teaching, the identity database 144 includes the OneStop Chosen Name Identifier, an internal Global Unique ID (GUID)—a unique code used internally that corresponds to the OneStop Identifier. The identity database may also include the user's identity proofing record and its LOAs. The user's identity proofing record indicates how, when, where, by whom the OneStop user was being identity proofed. For example, an OneStop user, as identified by Ryan Williams &Drew, was identity proofed by the OneStop system, by Experian, in November 2012. He has reached a LOA2. In another example, a second user, as identified by Ellen Smith &Willow, was identity proofed by the EPCS application, in May 2011, certified at LOA3.

In one embodiment of the present teaching, the identity database 144 may also include information about the credentials that bound to the OneStop user. For example, the user Ellen Smith&Willow, who is a registered user of the EPCS application (a trusted application), having an identity proofing record of LOA3, who is also bound to a Symantec hard token as issued from the EPCS application, which ensures LOA3 authentication. The Symantec hard token is a digital credential that may be uniquely identified by, for example, a serial number of the hard token. In this example, the serial number will also be included in the identity database 144, for example, as a credential attribute as associated with the OneStop user Ellen Smith&Willow. Additionally, the credential attribute may also include other information about the credential, for example, the LOA3 assurance level, the URI for verify this credential, and other information needed to initiate the authentication service of this credential.

The identity database may include the serial number of the Symantec hard token, as well as its LOA3 credential strength in Ellen's record in the identity database 144.

In another embodiment of the present teaching, the credentials database 148 includes information about the credentials that are bound to the OneStop user. In this embodiment, the identity binding (association between an identity and one or more credentials) is separate from the identity proofing records.

In accordance with the embodiments described herein, the trusted application 130 can redirect to OneStop identity service provider 140 to authenticate the end user 110 with its required overall LOAs.

Overall LOAs of the identity service, as defined by the NIST document 800-63-1, is determined by the LOAs in 3 aspects: identity proofing, credential strength, and authentication process. The overall LOA is the least LOAs achieved by the three. For example, to reach an overall LOA3, the identity service need to have LOA3 or above in identity proofing, using credentials with strength of LOA3 or above, and applying authentication process with LOA3 or above (which requires at least two factor authentication).

Credential service agents 150 refer to a plurality of service providers operable to, for example, issue credentials and provide credential services (e.g. verification of the credentials). For example, the credential service agents 150 may include an Authentifiy xFA 150-a, a service provider which provides two factor authentication based on a user's voice. In another example, the authentication service may be provided by Symantec 150-b where a hard token credential can be authenticated. In another example, the identity center 142 may request RSA Auth Manager 150-c to authenticate a hard token from RSA. Similarly, the identity center 142 may request other credential service provider 150-d to authenticate another particular type of credential.

FIG. 2-a shows exemplary user interface for a LOA2 application in which an end user may login via a LOA2 credential through OneStop, according to an embodiment of the present teaching. In this example, an exemplary subject application (ABC Healthcare Application) requires LOA2 assurance level for its authentication process. An existing user of the ABC application may login normally through its conventional user interface, such as, for example, the user interface 210. In other examples of the present teaching, the user interface 210 may include any other login or authentication interfaces that the subject application provides. In this example as shown in the user interface 210 of FIG. 2-a, the user is required enter his/her User Name, which is specific to the ABC application. The user is also required to enter a correct password that was specifically set up for the ABC application. With the growing numbers of web sites/applications that the user accesses, so do the number of authentication details, such as, username/password pairs, that the user is required to remember, or to manage. This can be quite burdensome.

As a convenient alternative, the user may login to a subject application with a consistent way through OneStop. In one example, the subject application, such as, for example, the ABC application, provides a user interface 220 where the user may, for example, be authenticated using the OneStop service. In contrast to using a particular user name that is specific to the subject application, the user may use an unvarying, universal name through OneStop (a Globally Unique OneStop Name, GUON), no matter what subject application is.

The user's universal name, GUON, includes the user's first name, last name and chosen name. As discussed earlier, OneStop ensures that the user's universal name (GUON) is the user's true names that have been sufficiently verified and identity proofed, at least, at the required LOA level. In this example, the user interface 220 provides user input field First Name 232, Last Name 234, and Chosen Name 236 for user to input its first name, last name and chosen name respectively. In another embodiment, the user interface 220 may include one text field which accepts the complete string of user's universal name GUON. In still another embodiment, the user interface 220 may provide a masked characters feature for inputting the user's universal name text field.

Further, in contrast to using a conventional password, or a particular credential that is tied to the subject application, the user may authenticate himself/herself with any qualifying credential (a credential that is at the desired LOA level or above). For example, the user interface 220 includes a credential list 242. The credential list 242 may include, for example, a list of credentials at the LOA2 or above that OneStop currently is operable to handle. In another embodiment of the present teaching, the credential list includes a list of credentials that are tailored to the current user and include credentials that the current user has acquired. In this embodiment, the credential list 242 may be presented to the user after the user has correctly entered its GUON via to the user interface 220.

In the example as shown in FIG. 2-a, the credential list 242 may include, for example, a Symantec credential 242-a, such as a hard token that displays a changing pass code. The Symantec credential 242-a may, for example, have been issued by OneStop and can be used for authentication at LOA3. The credential list 242 may also include an xFA credential 242-b with authentication valued at LOA3. In this example, the user may, for example, have registered with the xFA credential service provider, installed an xFA mobile application on the user's smart phone, and thus enabled to be authenticated by the xFA credential provider based on the user's voice print.

The credential list 242 may include for example, an Ezio Secure Card 242-c that the user may have acquired, for example, from Amazon.com. The Ezio Secure Card 242-c also provides a changing pass code in its user interface, and may have been issued, for example, at LOA2. The credential list 242 may include a credential 242-d, for example at LOA2, where the user can be verified by a code in a text message that will be sent from PayPal to the user's mobile phone (also called PayPal mobile phone security key).

The credential list 242 may also include a RSA secure ID 242-e that is issued from Superscript, with LOA3. The RSA secure ID 242-e may be, for example, a hardware device that displays a changing pass code that user is required to present during the RSA secure ID verification process. The credential list 242 may also include a credential 242-f that the user has acquired for two factor authentication with Microsoft. The credential 242-f may be, for example, qualified at LOA2 and allows Microsoft to send the user a code in an email, where user logs into the account for the first time on a PC or other device.

The user interface 220 may also include a component 244. The component 244 may be a button, or a link, or equivalent. Activation of the component 244 may, for example, initiate a process where the current user may add additional new credentials to the OneStop service provider.

FIG. 2-b shows exemplary user interface for a LOA3 application in which an end user may login via a LOA3 credential through OneStop, according to an embodiment of the present teaching. Similar to FIG. 2-a, the present teaching enables user to authenticate through a universal LOA3 authentication process through OneStop. Again, the user uses the user's Globally Unique OneStop Name (GUON) regardless what subject application the user is trying to access. Additionally, the user may authenticate himself/herself with any qualifying credential (a credential that is at the desired LOA3 level or above) that the user may have acquired.

In the example as shown in FIG. 2-b, a user interface 230 includes a credential list 252 at LOA3 that includes for example, a Symantec hard token 252-a, as acquired via OneStop, a XFA credential 252-b, and a RSA Secure ID 252-c, as acquired via SureScript.

The user interface 230 may also include, for example, the component 244 where the user may provide additional credentials at LOA3 or above to the OneStop system.

Figure 3:
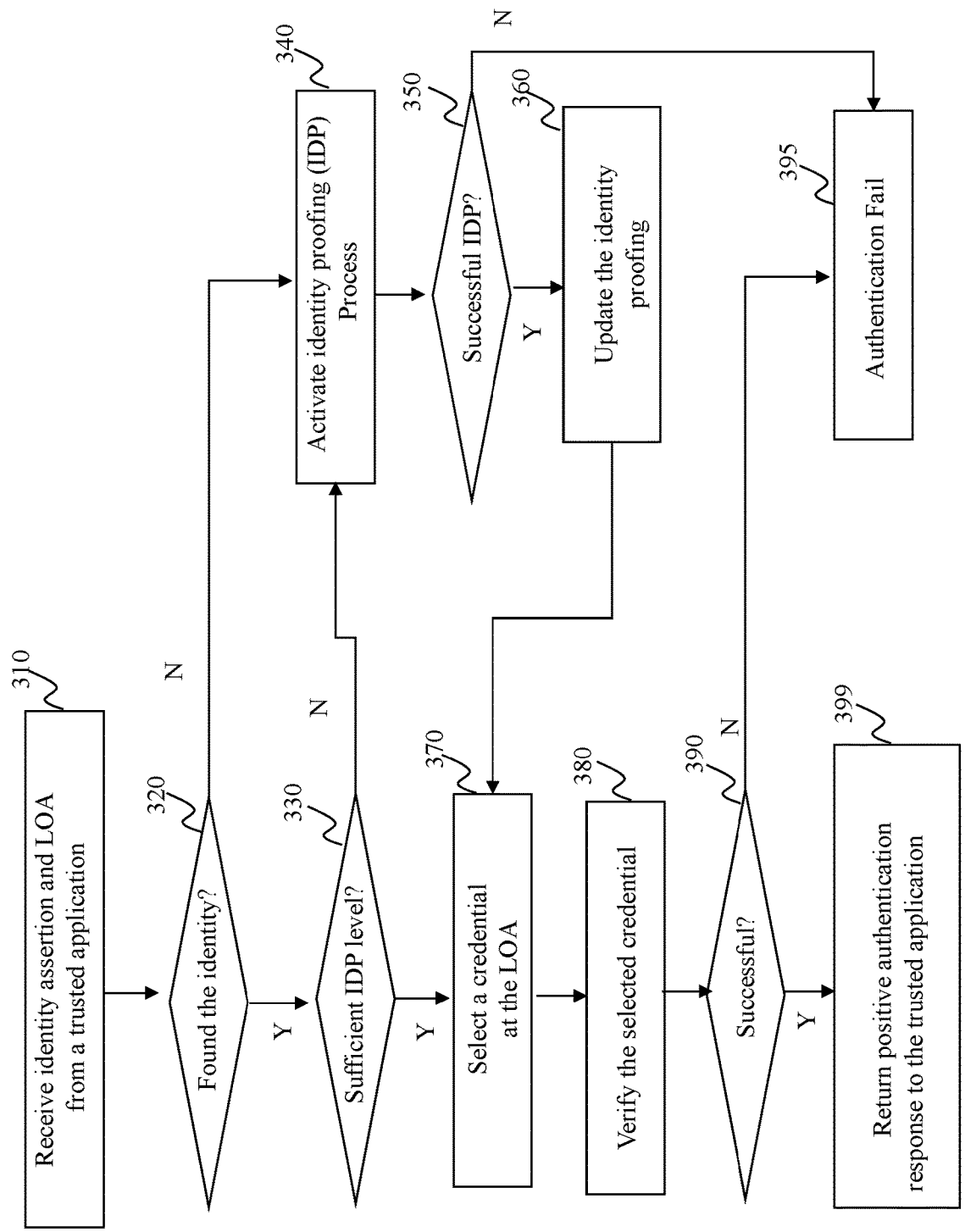
FIG. 3 is a flowchart of an exemplary process in which OneStop identity center authenticates a user at a requested LOA, according to an embodiment of the present teaching.

FIG. 3 is a flowchart of an exemplary process in which OneStop authenticate a user at a requested LOA, according to an embodiment of the present teaching. At step 310, OneStop receives an identity assertion and required LOA from a trusted application. The identity assertion may include, for example, the user's GUON, a string that includes user's first name, last name, "&" and chosen name. At step 320, OneStop searches in the identity database 144, for an OneStop identifier that matches with the received GUON. At step 330, if an identity record is found in the identity database 144, for example, with a matching GUON, OneStop continues to check the identity proofing record for the found identity.

Suppose, for example, the found identity does not have a sufficient level of LOA as indicated in its identity proofing records, OneStop may, for example, redirect the user to start the process for additional identity proofing at step 340. In one example, the user is directed to an Experian website, where additional identity proofing may be performed by requiring the user to answer a number of questions that are generated based on the user's financial record with Experian.

Upon successful completion of the additional identity proofing at step 350, OneStop may, for example, update the identity's identity proofing record, for example, with an elevated LOA, and/or with any other additional identity proofing details at step 360. If the user fails at additional identity proofing at step 350, OneStop may, for example, deny the user's identity assertion at step 395, for example, by responding with an authentication failure code to the requesting application.

If the found identity has an identity proofing record that indicates that the IDP level is, for example, at the requested LOA or above, at step 330, OneStop may continue to find qualifying credentials that are bound to this identity at step 370. In one embodiment of the present teaching, the qualifying credentials for the identity are stored in the identity database 144, as shown in FIG. 1. In another embodiment of the present teaching, as discussed in more detail below in FIG. 4, the qualifying credentials that are bound to the identity is stored by a separate credential database 148 and managed by the credential exchange 146.

In one embodiment of the present teaching, the user may select a particular credential to authenticate the user. In another embodiment of the present teaching, OneStop selects a "master" credential at the requested LOA. In another embodiment of the present teaching, OneStop enables the user to select from a list of available credentials.

In one embodiment of the present teaching, OneStop may initiate the process to verify the selected credential at 380. For example, OneStop may redirect the user to the credential verification service provider as related to the selected credential.

If the selected credential is verified successfully at step 390, OneStop may, for example, provide a positive authentication response with respect to the user to the trusted application at step 399. In one embodiment of the present teaching, OneStop adopts the OpenID Connect protocol, and provide an ID token for the user to the trusted application. In another embodiment of the present teaching, OneStop may provide a SAML token with respect to the user to the trusted application. In still another embodiment of the present teaching, OneStop may provide a signed digital identity with respect to the user to the trusted application.

If, however, verification of the selected credential fails at step 390, OneStop may, for example, return an authentication failure response at step 395.

Figure 4:
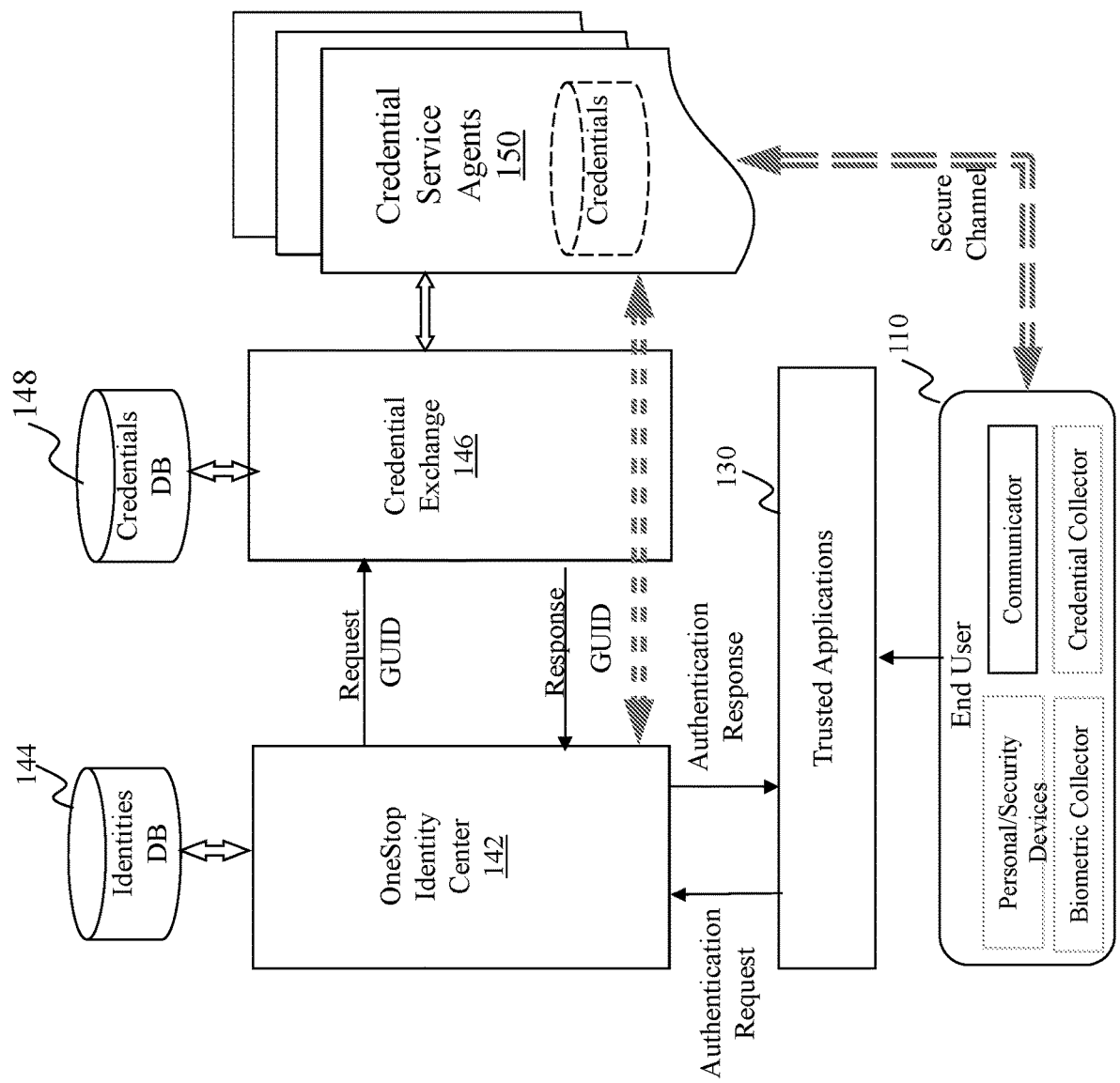
FIG. 4 shows an exemplary system diagrams of OneStop identity center, according to an embodiment of the present teaching.

FIG. 4 shows exemplary system diagrams of OneStop with a standalone credential binding system, according to an embodiment of the present teaching. Having a standalone credential binding system provides strong privacy because it creates a separation between a person's identity information and the person's credentials, i.e., information needed to prove the person's identity. In other words, the authentication process is separate from the identity information. In this embodiment, the link between the person and the person's identity is managed by an internal ID (GUID) of OneStop, which cannot be used nor understood by any other entity or system.

In this embodiment of the present teaching, the OneStop identity center 142 may manage the identity proofing process during the registration process of a user. The OneStop identity center 142 may engage various trusted identity proofing services or agents to register a user.

The credential exchange 146 in this embodiment provides no link to the person, or the person's identity information/ attributes. Such implementation separates identity proofing process from the identity binding process.

In this embodiment of the present teaching, the credential management and services may be handled by an independent system that comprises a credential exchange 146, credentials database 148, and a number of credential service agents 150.

Credentials database 148 stores credential records for all OneStop users, as well as information related to the verification of the credential. For example, an OneStop user may have a Symantec hard token that was issued to him/her as a LOA2 credential. The credential database 148 may store, for example, a credential record for the OneStop user that includes, for example, the serial number of the Symantec hard token, its classification as a LOA2, its issuing entity OneStop, the URL that relates to the verification process of the hard token, the valid period of the hard token, the option to renew, the permission to replace with a new hard token, and any other relevant information. The OneStop user may be referenced in the credential database 148 by, for example, a GUID of the OneStop user.

A credential record in the credential database 148 is configured to store various types of credentials of different LOAs. For example, a credential record may store a LOA2 strong or encrypted password, a credential record may store an identifier to a LOA3 or LOA4 smart card, a credential record may store a mobile phone id. A credential record may also be operable to store PKI keys, digital certificates or any other type of digital credentials.

The credential exchange 146 may also manage credential binding, where an OneStop user's GUID becomes associated with a credential record. The credential exchange 146 also manages credentials for OneStop users and initiates credential verification process with appropriate credential service agents 150. In one embodiment of the present teaching, the credential exchange 146 is operable to issue new credentials to OneStop users, for example, at the demand of OneStop identity center 142. The credential exchange 146 may be operable to issue replacement credentials for OneStop users or to extend the expiration period of an existing credential.

In one embodiment of the present teaching, the credential exchange 146 is a cloud based service provider that operates independently of OneStop identity center 142, where secure communication between OneStop and the credential exchange 146 is maintained.

In the present teaching, end user 110 may include an entity, such as, for example, a person, that communicates with trusted applications 130. The end user 110 may have access to a number of personal devices, such as, for example, a mobile phone, a personal computer. The end user 110 may also have access to a number of security devices, such as, for example, a smart card, a Symantec token, a RSA secure ID, an Ezio secure card. The end user may also have access to a communicator, such as a lap top computer, a mobile phone, or a tablet computer, which can have access to the Internet and can communicate with service providers online. The end user 110 may also have access to biometric collectors, for example, a voice recorder, a fingerprint scanner, an iris scanner and any other devices and computer applications that is required to collect a particular biometric sample. The end user 110 may also include any other credential collector, such as, for example, any device, any computer or mobile applications, whereby the person may provide inputs about a particular credential so that the credential can be verified.

Figure 5:
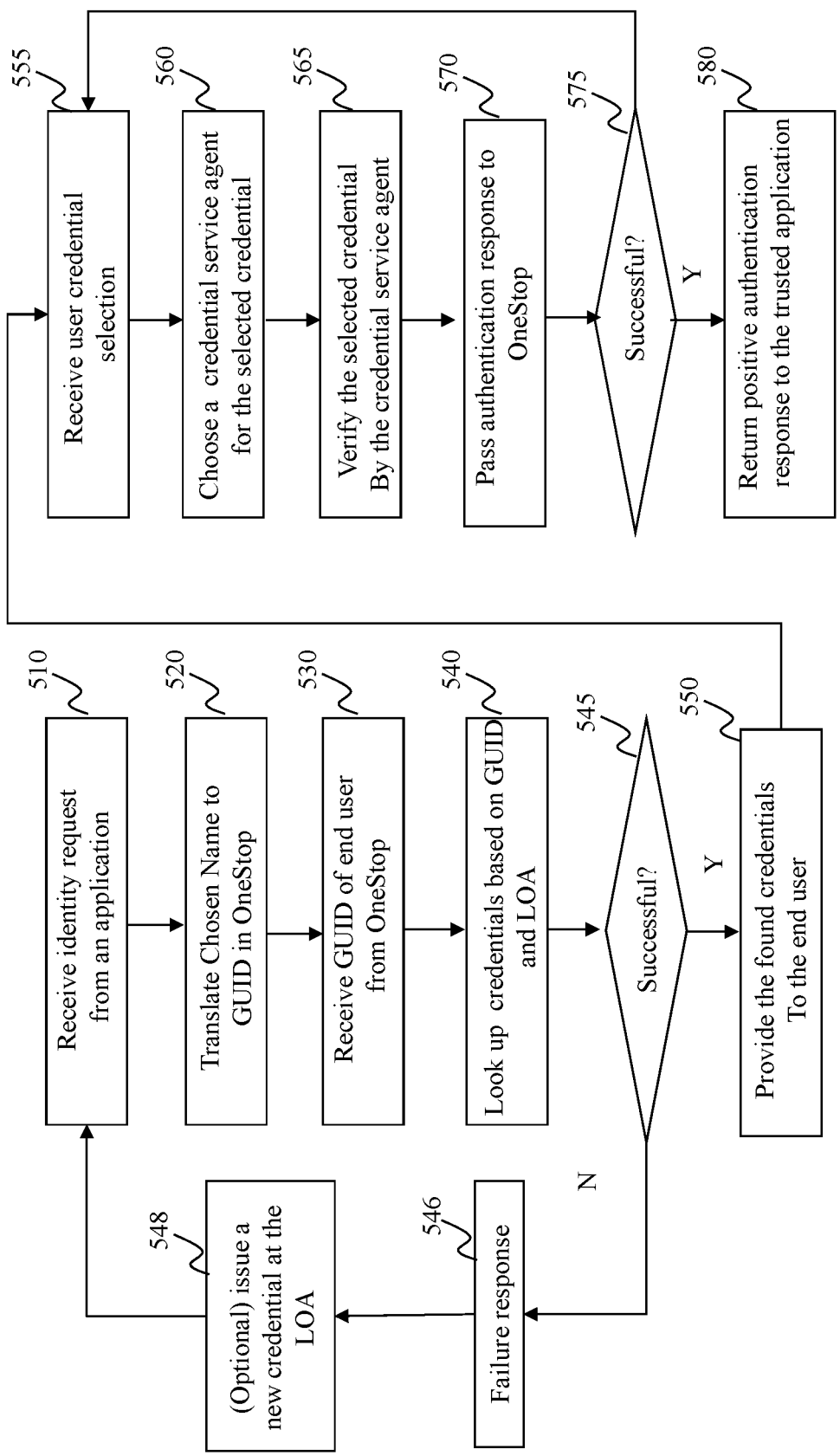
FIG. 5 shows a flowchart of an exemplary process in which OneStop identity center authenticates the user at a particular LOA with reusable credentials, according to an embodiment of the present teaching.

FIG. 5 shows a flowchart of an exemplary process in which the OneStop identity center 142 communicates with a standalone credential exchange 146 to manage credentials for OneStop users, according to an embodiment of the present teaching. At step 510, OneStop identity center 142 receives an identity request, for example an authentication request of an end user 110, from a trusted application 130. The authentication request may include the end user's OneStop identifier GUON (First Name, Last Name and &Chosen Name), and an overall LOA level that the trusted application 130 requires for the authentication quality. Assuming, in this example, the end user 110 is a valid, pre-registered user in OneStop, and the end user 110 has an identity proofing record of required LOA or above. The end user 110 is identified with the user's GUON and is referenced internally in the OneStop system with a corresponding GUID. At step 520, the OneStop identity center 142 may translate the OneStop identifier GUON (First Name, Last Name and &Chosen Name) to the corresponding GUID that uniquely identifies the end user's 110 account in OneStop.

At step 530, the OneStop identity center 142 may send a credential request to the credential exchange 146. The credential request includes, for example, the GUID of the end user 140, and the LOA that the trusted application 140 requires. At step 540, upon receipt of the GUID and the credential request, the credential exchange 146 look up available qualifying credentials for the end user 110 based on the GUID and the LOA. For example, the credential exchange 146 may search in the credential database 148 and obtain a list of all active credentials that are bound to the GUID and has an LOA at the requested LOA or above.

If the search is not successful and found a qualifying credential for the end user 110 at step 545, the credential exchange 146 may return a failure response to OneStop identity center 142, at step 546. In one embodiment of the present teaching, upon receipt of a failure response from the credential exchange 146, the OneStop identity center 142 may initiate a process to issue a new credential at the desired LOA to the end user 110 at step 548. In one embodiment of the present teaching, upon successful issuance of the new credential to the end user 110, the OneStop identity center 142 may bind the new credential to the end user 110 in the credential exchange 146. For example, the OneStop identity center 142 may send a "Bind" request to the credential exchange 146, which may include the new credential information and the GUID which shall be bound to the new credential.

If the search is successful, the credential exchange 146 provides the found credentials to the OneStop identity center 142 at step 550. In one example, the credential exchange 146 may provide, for each qualifying credential, the identifier of the credential (e.g. a serial number of a Symantec token or a serial number of a RSA secure ID). Upon receipt of the credential list, the OneStop identity center 142 may display the list of credentials to the end user 110 in a user interface, such as, for example, the user interface component 220 or 230 as shown in FIG. 2-*a*, FIG. 2-*b*, respectively.

At step 555, the OneStop identity center 142 may receive a credential selection made by the end user 110, for example, through a user interface component 220 or 230 as shown in FIG. 2-*a* and FIG. 2-*b* respectively. In one embodiment of the present teaching, user selection of the credential in the user interface 220 or 230 may trigger the presentation of a credential verification user interface, where the end user 110 is enabled to input information needed to verify the credential. For example, user selection of the Symantec (OneStop) 242-*a* credential may trigger the presentation of another user interface, such as, for example, a text box to enter a onetime pass code.

The credential exchange 146 may select a credential service agent 150 that provides the verification service of the user selected credential at step 560. The credential exchange 146 may, for example, initiate a verification process in the selected credential service agent 150 at step 565.

In one embodiment of the present teaching, the OneStop identity center 142 collects user inputs that relate to verification of the selected credential via a user interface (e.g. the text box to center the onetime passcode) and pass the user inputs (e.g., the onetime passcode that user provided) on to the credential exchange 146 in a "Credential Verification" request. The credential exchange 146 may, for example, assemble information required to verify the credential based on the received user inputs to the selected credential service agent 150. The credential exchange 146 may also provide to the selected credential service agent 150, additional information from the credential database with respect to the selected credential, including, for example, the GUID, the verification history of the selected credential, the expiration period of the selected credential, as well as other information related to the selected credential.

In one example, the end user 110 may have selected a Symantec hard token, for example by selecting the Symantec (OneStop) component 252-*a* via the user interface 230 as shown in FIG. 2-*b*. In one embodiment of the present teaching, the credential exchange 146 may obtain information needed to verify the selected credential from the credential record of the selected Symantec token and pass them to the Symantec credential service agent 150-*b*. For example, the credential exchange 146 may provide the serial number of the Symantec hard token and a onetime passcode that user provided.

At step 565, the selected credential service agent 150 may verify the selected credential. For example, the selected credential service agent 150 may communicate with the end user 110 via a secure channel to complete the verification process. For example, the end user 110 may have selected a xFA credential, for example by selecting the xFA component 252-*b* via the user interface 230 as shown in FIG. 2-*b*. In one embodiment of the present teaching, the credential exchange 146 may provide a link through the OneStop user interface to an xFA client application so that the end user 110 may be enabled to establish a secure channel with the xFA credential service provider.

In this example, the credential exchange 146 may provide an internal xFA ID whereby the end user 110 is bound in the xFA system. The internal xFA ID may, for example, be stored as a part of the credential record for the xFA credential of the end user 110 in the credential database 148. The end user 110 may, for example, provide verification information through the secure channel, such as, for example, provide a voice sample, as well as the xFA internal ID, to the xFA credential service provider to complete the verification process of step 565.

As a result of the credential verification step of 565, the selected credential service agent 150 may pass the authentication response to the OneStop identity center 142 at step 570. In one embodiment of the present teaching, the selected credential service agent 150 may send the verification result to the credential exchange 146.

In another embodiment of the present teaching, the selected credential service agent may send the verification result directly to OneStop identity center 142.

In one embodiment of the present teaching, the selected credential service agent 150 includes a credential database and provides credential binding services. In this embodiment, the selected credential service agent 150 binds the user's OneStop GUID with the user's credential information, such as for example, the user's initial voice sample, the serial number of a hard token. In this embodiment, the OneStop identity center 142 may send the credential verification request directly to the credential service agent 150 with respect to a GUID. The credential verification agent may receive verification results directly from the credential service agent 150, at step 570.

In event the credential verification step of 565 fails, the end user 110 may, for example be directed to the user interface (e.g., 220 or 230 of FIG. 2-*a*, FIG. 2-*b*) to try again or to select a different credential.

If the credential verification is successful at step 575, the OneStop identity center 142 may return a positive authentication response to the trusted application. For example, the OneStop identity center 142 may provide an ID token with an expiration time and following the OpenID Connect protocol. In another example, the OneStop identity center 142 may provide a SAML token to confirm the identity assertion. In still another example, the OneStop identity center 142 may provide a signed digital identity for the end user 110.

FIG. 6-*a* shows a conceptual view of an exemplary role of OneStop in which OneStop as an attribute broker among various sites, according to an embodiment of the present teaching. As shown in FIG. 6-*a*, a person 610 may have identities 1 (610-*a*) to n (610-*n*) that he has established that are distributed in site 1 to n, respectively. OneStop provides a centralized management for identities 1-*n* via the trust relationship between the OneStop web site 630 and the various site 1-*n*.

OneStop provides one universal OneStop identity 620 that may, for example, access to all attributes provided by identities 1-*n*. In one embodiment of the present teaching, OneStop is operable to propagate attribute values across identities 1-*n* to provide an efficient manner in updating shared attributes. For example, Ellen Smith&Willow, as registered with OneStop, may have changed her last name from "Smith" to "Gates" upon marriage. In one embodiment of the present teaching, the last name attribute is maintained at OneStop; Ellen has, for example, consented to share this OneStop last name attribute with site 1-*n* automatically. As a result, OneStop may update sites 1-*n* with the last name change in identities 1-*n* respectively.

FIG. 6-*b* shows portions of data used in an exemplary attribute management feature, according to an embodiment of the present teaching. As a centralized manager for a person's identity, OneStop manages all accessible identity attributes that are associated with the OneStop user. In one embodiment of the present teaching, OneStop ensures source site of each attribute and provides guidance as to where else (other sites) such attribute are also used.

In one embodiment of the present teaching, as show in FIG. 6-*b*, OneStop owns and provides a number of demographic attributes of a person, such as, for example, first name, last name, date of birth, gender and zip code. Following the OneStop user's consent (See FIG. 6-*d*), OneStop may share these demographic attributes with a list of applications, such as, for example, sites as listed on the corresponding "Attribute Consumer" column. In the example as shown in FIG. 6-*b*, OneStop may share the OneStop user's first name, last name and gender with n sites (site 1-*n*). In contrast, OneStop may share the Date of Birth attribute of the user to only 2 sites (site 1—Citi bank and site n-my-health.com).

To be a trusted attribute source, OneStop may follow certain protocols to ensure the accuracies of these attributes. For example, OneStop may periodically check with the US post office to ensure that it has the most recent zip code of its use.

FIG. 6-*c* shows exemplary system diagrams of OneStop where OneStop acts as an attribute broker, according to an embodiment of the present teaching. The present teaching enables the user to determine the scope of the attributes that are shared. The present teaching also enables the user to manage which site the user chooses to be the source of particular attribute, and which site(s) may consume (get updates from) the attribute values from the source site. End users 110 in this embodiment use the OneStop application 635 to interface with the OneStop identity service provider 140 for registration and attribute sharing.

The present teaching also enables an attribute exchange among various applications with a centralized authorization model. In one embodiment of the present teaching, OneStop applies the OAuth 2.0 protocol to provide authorization and access control to attribute sharing based on user consent. In this embodiment, OneStop acts as the pseudo resource owner. As a result, user authorization can be implemented in one centralized OneStop authorization server, such as, for example, OAuth2 Authorization Server 644. The present teaching alleviates the burden on each site/resource owner to implement its own authorization server.

OAuth 2.0 protocol has three phases: (1) requesting an Authorization Grant; (2) exchanging the Authorization Grant for an Access Token; and (3) accessing the resources using this Access Token. In one embodiment of the present teaching, OneStop uses OpenID Connect (http://openid.net/connect/faq/) as another identity layer on top of OAuth 2.0 protocol. OAuth applications can get authentication event information over the ID Token and can get the extra claims of the authenticated user from the OpenID Connect UserInfo endpoint.

Attribute Sharing Manager 640 is operable to manage the attribute sharing among various trusted applications 130. As shown in the user interface below in FIG. 6-*d*, attribute sharing manager 640 receives user decisions as to what attributes to share, to which the attributes are shared and store the attribute sharing decisions in an attribute map database 642.

The attribute sharing manager 640 may also be operable to ensure the accuracy of the attributes. For example, the attribute sharing manager 640 may periodically check with government or authorities to maintain the accuracies of the attributes. For example, the attribute sharing manager 640 may periodically check with the address changes requests submitted in the US postal to update zip code attribute of OneStop users. In another example, the attribute sharing manager may periodically get updates from the Social Security Administration's website.

In another example, the end user may manually change the attributes. In another example, a certified trusted entity may be enabled to conduct attribute updates in the attribute sharing manager 640, such as a trusted site of an auditing agency or regulation website, or an identity proof agent.

The attribute sharing manager 640 may keep a record of attributes revision history, such as, for example, the time, place and manner as to how the attribute is revised, the value change at each revision.

The OneStop identity service 140 in this embodiment further includes an OneStop registration service 646 that is responsible for registering OneStop users upon identity proofing of the users by identity proofing agents 648. The details of OneStop user registration are described below with respect to FIG. 8.

FIG. 6-*d* shows an exemplary user interface of OneStop where the user may manage attribute sharing among various trusted applications. The user interface 650 includes four components: UI component 652, 654, 656, and 658.

The UI component 652 allows the user to select one or many attributes that are to be shared among a set of applications/sites. The UI component 652 also allows the user to update any attribute values, for example by clicking on the update button. The UI component 652 may also allow user to select other attributes that are not currently displayed, by clicking on the "More" button, which may trigger another UI for displaying more attributes options.

The UI component 654 allows the user to select the set of application/sites where the attributes selected, for example, in UI component 652, may be shared. The UI component 654 allows the user to consent to the attributes sharing to the set of selected applications. The UI component 652 may allow the user to select more sites to share the selected attributes, for example, by clicking on the "More" button, which may trigger another UI for displaying more application/site options.

The UI component 656 allows user to select a default set of attributes with new applications. In this example, the user may elect from a list of demographics information, including the user's first name, last name, zip code, gender and birth month and day.

The UI component 658 allows the user to reject any attribute sharing among the applications, by for example, click on the "Deny" button.

Figure 7:
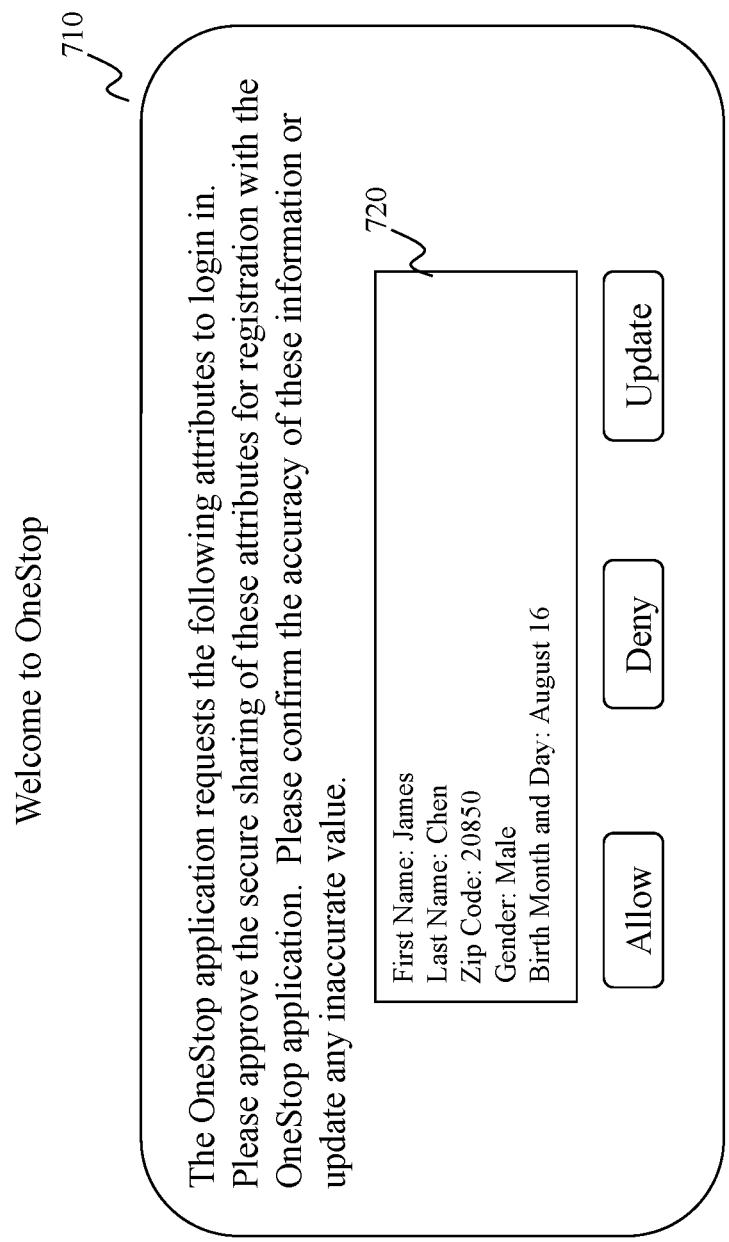
FIG. 7 shows exemplary user interface for an authenticated user of a trusted application to register with OneStop identity center, according to an embodiment of the present teaching.

FIG. 7 shows exemplary user interface for an authenticated user of a trusted application to register with the OneStop identity service provider, according to an embodiment of the present teaching. The trusted application may be certified to have an overall LOA for its users. The trusted application may be a member of the trust frame work, or have been certified by a third party or an government agency to have followed the practices to reached LOA when identity proofing for its users. In one example, the trusted application is certified at LOA3, thus ensures its users to have passed LOA3 identity proofing. The trusted application may also use a LOA3 credential to authenticate its users. Assuming OneStop identity service provider is to trust the trusted application, the authenticated user of the trusted application may be provided an option to become an OneStop user, so that the user may have access to the OneStop identity services.

In one embodiment of the present teaching, during an active session of the authenticated user in the trusted application, the user may have access to the user interface 710, as shown in FIG. 7, to automatically register to OneStop identity service provider. In this example, the trusted application provided to the authenticated user a list of attributes that OneStop requires, as shown in UI component 720. The list may include, for example, the user's 5 attributes as stored in the trusted application, such as, for example, first name, last name, zip code, and gender and birth month. The user may elect to consent to the sharing of these 5 attributes.

The user may elect to not consent to the sharing of these 5 attributes. The user may also elect to update any inaccuracy of these 5 attributes. Having user consent to the sharing of these 5 attributes, may enable OneStop to initiate a registration process of the authenticated user, which will be explained in more detail below in FIG. 8.

Figure 8:
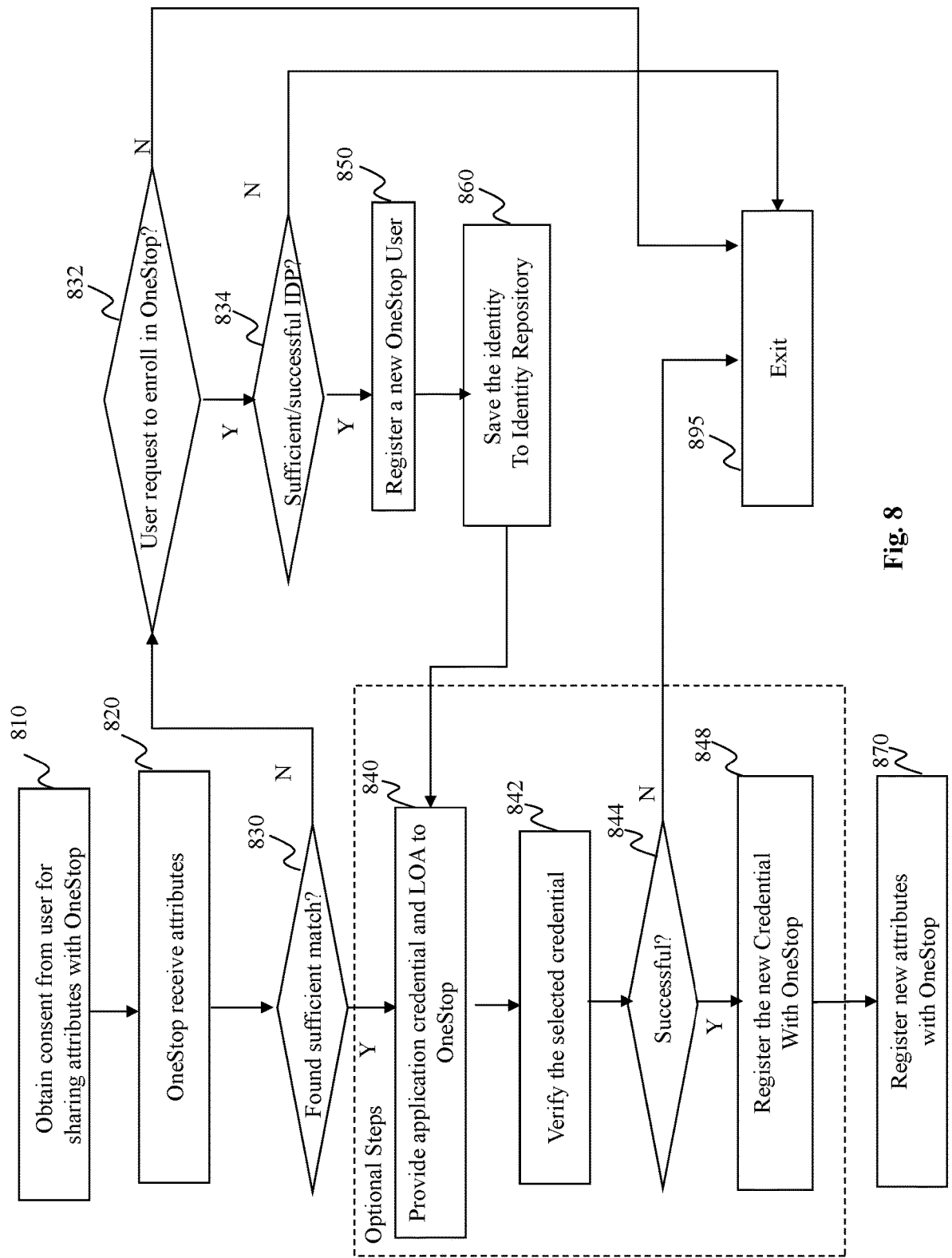
FIG. 8 shows a flowchart of an exemplary process in which an authenticated user of a trusted application shares the user's identity attributes in the trusted application with OneStop identity center in order to register with OneStop identity center and become a OneStop user identity center, according to an embodiment of the present teaching.

FIG. 8 shows a flowchart of an exemplary process in which an authenticated user of a trusted application shares the user's identity attributes in the trusted application with OneStop service provider in order to register with OneStop and become an OneStop user, according to an embodiment of the present teaching.

In one embodiment of the present teaching, OneStop may enroll users of a trusted application in batch mode. For example, the trusted application may share with OneStop a group of its users' profiles or attributes, such as, for example, demographics attributes. Trusting these users to have been properly identity proofed by the trusted application at a certain LOA, OneStop may register the group of users in the OneStop system in a batch mode. In one example, OneStop may register a group of users from an EPCS application, where the EPCS users are doctors who may prescribe controlled substances to patients. The EPCS users are identity proofed at LOA3 and are authenticated to the EPCS application at LOA3 via a two factor authentication process.

OneStop may, for example, check to make sure that the EPCS user does not already have an OneStop user account. In one embodiment of the present teaching, OneStop may create a default chosen name for each new user from EPCS application and allow the new user to change it when the new user's first login to the OneStop. For example, OneStop may use the new user's birth month and day as the user's initial temporary chosen name. For a user who has a birth date of August 16, OneStop may create a default chosen name, such as, for example, "0816" or "Aug16" or "August16."

In another embodiment of the present teaching, as illustrated in FIG. 8, an authenticated user of a trusted application may individually register to the OneStop system. At step 810, the trusted application may obtain the current authenticated user's consent to share a list of attributes with OneStop. For example, the trusted application my present to the currently authenticated user a user interface, such as for example, user interface 710 in FIG. 7, a list of attributes that OneStop requires. Upon receiving the current user's consent, the trusted application securely sends the OneStop the attributes with respect to the current user.

At step 820, OneStop receives the current user's identity attributes from the trusted application. At step 830, OneStop may, for example, search within OneStop to see if there is any existing user that has matching attribute values to the received attributes values. If so, the user is already registered in OneStop. OneStop may enable the current user the option to (a) register a new credential, such as, for example, the credential that the current user used to be authenticated by the trusted application (via steps 840, 842, 844 and 848); (b) register new attribute(s) of the user with OneStop (step 870).

In one embodiment of the present teaching, in step 840, the current user provides the current application credential to OneStop. For example, the current user of the EPCS application may provide the serial number of the Symantec token to OneStop. In one example, OneStop may also require user to provide the onetime passcode showing on the Symantec token. In one example, OneStop may verify the Symantec token at step 842. The verification of the selected credential is checked at step 844. Upon successful verification, OneStop may bind the new credential, such as, the Symantec token, to the current user's OneStop account, at step 848. If the verification of the selected credential is unsuccessful, then the process exits at step 895.

At step 830, if the current user of the trusted application is not found within OneStop, the user may, for example, provided an option to enroll in OneStop through a user interface at step 832. The user may, for example, choose to proceed with enrolling in OneStop at 832. If the user opts not to be enrolled in OneStop, the process exits at step 895. At step 834, whether the user has passed sufficient identity proofing process in the trusted application and has reached sufficient LOA for identity proofing are checked. If the test is failed at step 834, then the process exits at step 895. If the user has passed sufficient identity proofing process in the trusted application and has reached sufficient LOA for identity proofing at 834, then OneStop may register the user in OneStop at step 850. For example, OneStop may, at step 860, save the current user and the user's attributes in OneStop's identity repository, such as, for example, the identity database 144.

In one embodiment of the present teaching, OneStop may also provide the current user with the option to register a new credential via steps 840, 842, 844 and 848. OneStop may also provide the current the user with the option to register new attribute(s) from the trusted application with OneStop at step 870.

Figure 9:
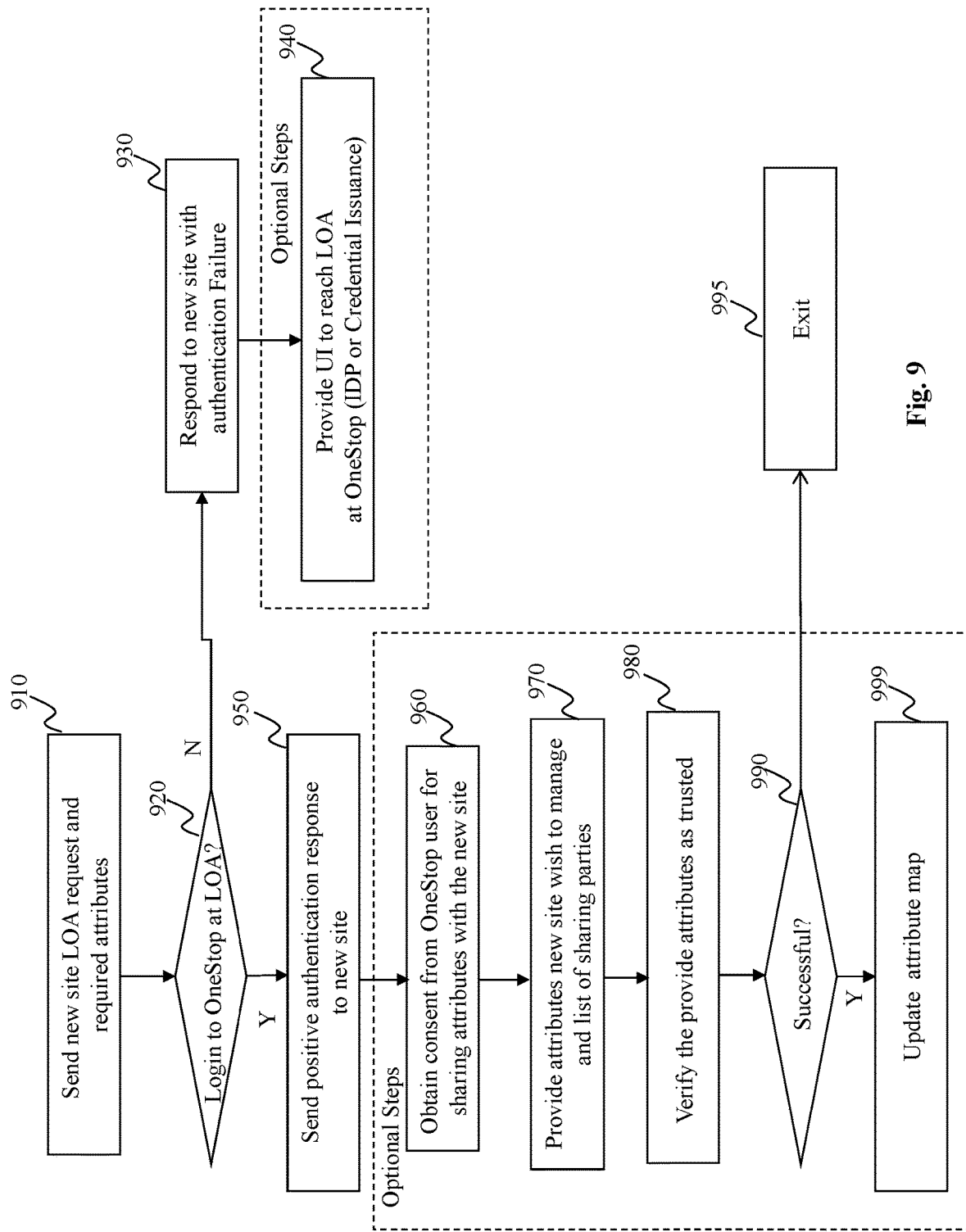
FIG. 9 shows a flowchart of an exemplary process in which an OneStop identity center user get registered to a new trusted application, according to an embodiment of the present teaching.

FIG. 9 shows a flowchart of an exemplary process in which an OneStop user may register to a new trusted application, according to an embodiment of the present teaching. To register with a new trusted application, a user normally needs to provide a significant amount of information with respect the user to the new application. Some of this information, for example, is used for identity proofing purposes. Some of this information is needed for specific use by the new application. The present teaching provides interoperable identities through OneStop which allows a trusted new application to delegate the identity proofing task to OneStop. As a result, the user is relieved of the burden to provide a lengthy list of information, e.g., fill out a 20 page PDF form online, and do so repeatedly, as each new application may require similar information for purpose of identity proofing.

In one embodiment of the present teaching, the new application may decide to trust the identity proofing LOA that OneStop provides and forego the need to acquire these attributes. In another embodiment of the present teaching, the new application may still collect a number of attributes through OneStop attribute sharing mechanism, for example, to perform its own identity proofing process. In this example, the user may need to consent to a scope of the attributes that the new application may consume, such as, for example, provide inputs through the user interface 656 components, as shown in FIG. 6-d.

With respect to user information/attributes required specific to the new application, the present teaching provides various novel features. First, OneStop enables attribute sharing, so that the new application may consume existing user attributes from other applications, so that the user are also relieved of the burden to provide these attributes repeatedly. For example, a board certified doctor may have registered with an electronic prescription application, such as Rcopia. The doctor has provided Rcopia with information/attributes relate to his medical training upon registering to the Rcopia application. The same list of attributes will be needed for a new EPCS application, where the doctor may prescribe controlled substances. With the present teaching, the user may simply consent the sharing of these attributes from Rcopia to EPCS through OneStop.

Additionally, OneStop enables the user to manage these attributes in one place, such as, in the Rcopia application. OneStop may enable or to provide attribute updates from the attribute source/owner, such as the Rcopia application, to the attribute consumers, such as the EPCS application. As such, the user no longer to do updates to these attributes, repeatedly, in each application that uses them.

Second, OneStop enables the expansion of the user attributes openly because new attributes can be provided to the ecosystem from any application through time. Further, the distributed nature of the attributes which exists in an ever increasing number of applications, will allow a scalable overall ecosystem to expand without limit.

In reference to FIG. 9, a new trusted application may provide an option for a new user to register to the new trusted application through OneStop. Upon user selection of this option, the new trusted application may send to OneStop its registration requirement, including for example, the overall LOA that the new application requires, a list of attributes with respect to the user that the new application would like to receive from OneStop, step 910.

In one embodiment of the present teaching, the new application may also provide a user interface for the user to login to OneStop at the desired LOA, such as, for example, user interface 220 or 230 as shown in FIG. 2-*a* and FIG. 2-*b*. If the user successfully logins to OneStop at the desired LOA at step 920, the OneStop service provider may provide a positive authentication response to the new site at step 950. Otherwise, OneStop responds to the new application with authentication failure at step 930. At step 940, OneStop my provide options for the failed user to remedy the failed login. In one embodiment of the present teaching, if the failure is due to insufficient identity proofing, OneStop may provide user interface to enable user to undertake more identity proofing process to reach a desired LOA level. In another example, if the failure is due to the lack of a credential having the sufficient LOA, OneStop may initiate a proper credential issuance process.

Upon successful login to the OneStop at the required LOA, the new application may, for example, interact with OneStop to complete the registration process. In one example, the new application requires additional attributes from OneStop. The user may, for example, be provided with a user interface, similar to the user interface shown in FIG. 6-*d*, so that user may consent to the sharing of the list of required attributes to the new application at step 950.

Further, the new application may enable the user to select a list of new attributes elect to the new application be the source/owner of these attributes at step 960. The new application may also enable the user to provide a list of attribute consumer applications/sites for each new attribute, so that these new attributes or their updates can be shared to the attribute consumer applications/sites, at step 970. In another example, the new application provides new attributes to OneStop and entrust OneStop to be the attribute source for these attributes.

In one embodiment of the present teaching, OneStop may accept the user's creation of these new attribute values in the new application as is. In another embodiment of the present teaching, OneStop may provide additional service, such as, for example, verifying the newly added attributes and their values before accepting them in the OneStop system at step 980. For example, a new attribute "NPI number" is entered by the user of a new eRx application. OneStop may trigger verification services from another entity, such as, for example, a database that includes the most current NPI number data to ensure the accuracy of the NPI number value. The verification result is checked at step 990. If the verification is not successfully, the process exits at step 995.

Finally, if the verification is successful, OneStop may update the attribute map to include the attribute management settings with respect to the new application, at step 999. For example, OneStop may record the attribute sharing of the existing attributes to the new application. OneStop may also record the new attributes and the consumers of the new attributes. In another example, the new application provides new attributes to OneStop and entrust OneStop to be the attribute source for these attributes.

Figure 10:
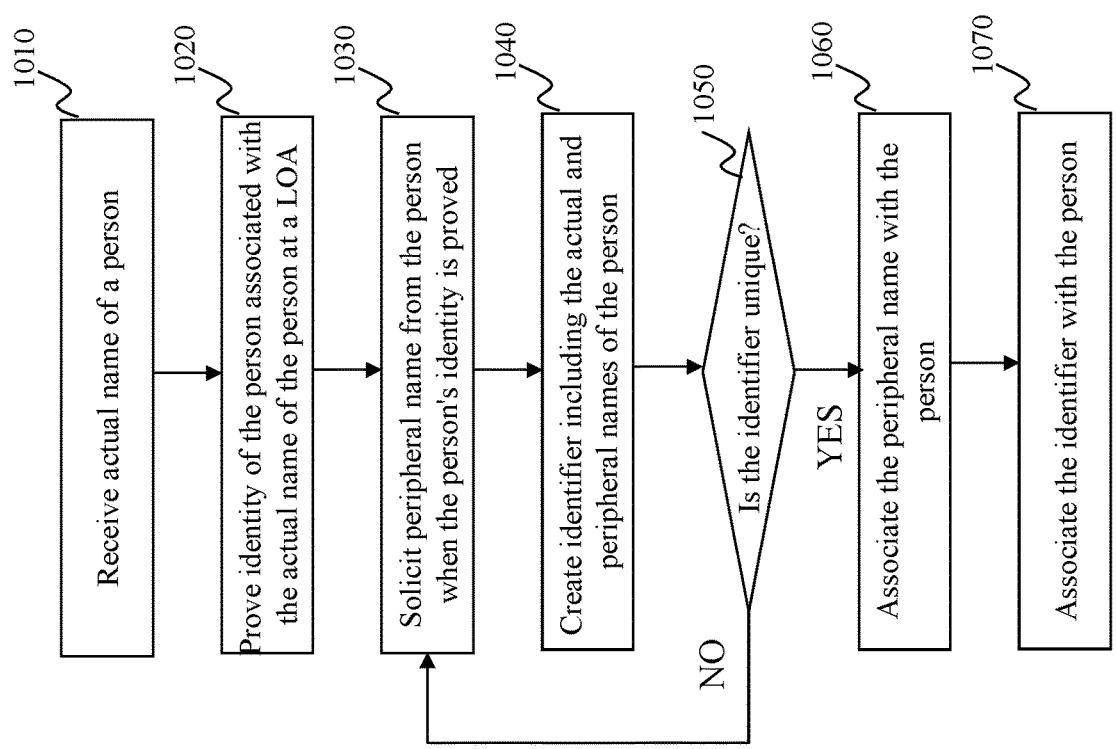
FIG. 10 shows a flowchart of an exemplary process for generating an identifier for a person, according to an embodiment of the present teaching.

FIG. 10 shows a flowchart of an exemplary process for generating an identifier for a person, according to an embodiment of the present teaching. In operation, at 1010, the actual name of a person is received. The actual name may include a first name, a middle name, and/or a last name of the person. The actual name may be the name appeared on the official ID, e.g., passport, of the person issued by a government. Depending on the nationality of the person, the actual name may be in any language, such as for example, English, Spanish, German, French, Italian, Chinese, Japanese, Korean, etc.

At 1020, the identity of the person that is associated with the actual name of the person is proved at a pre-determined level of assurance (LOA) required by an identity management system. The identity management system may be any component in the system 100 as disclosed above with respect to FIGS. 1-9, for example, the OneStop identity service provider 140 or any trusted applications 130.

At 1030, when the identity of the person has been proved at 1020, a peripheral name is solicited from the person. The peripheral name may be any name other than the person's actual name, for example, a name chosen by the person (chosen name). The peripheral name may be in one or more language, such as for example, English, Spanish, German, French, Italian, Chinese, Japanese, Korean, etc. In one example, the entire peripheral name is in the same language. In another example, part of the peripheral name is in one language, while other part(s) of the peripheral name are in different language(s). The identity management system may reserve one or more peripheral names for the person as associated with the actual name.

At 1040, an identifier is created for the person, which includes the actual name and the peripheral name from the person. The peripheral name may further include a symbol, such as but not limited to, "+," ";," "%," "@," "~," "#," "^," "&," and "*." The number of the symbol(s) is not limited to 1, and can be any number, such as 2, 3, or more. The symbol may connect the actual name and the peripheral name.

At 1050, whether the identifier is unique is determined. In one embodiment, the dissimilarity between the identifier and each of one or more existing identifiers is determined. Whether the identifier is unique is then assessed based on the dissimilarities and a threshold. For example, the dissimilarity may be determined based on at least one of: Jaro-Winkler distance, Levenshtein distance, Euclidean distance, cosine/sine distance, Chapman length, Soundex clustering, linear clustering, and non-linear clustering. The dissimilarity may also be determined using a machine learning approach. Any suitable machine learning approach that catches common errors can be used in the present teaching. For example, common typos, such as skipping a letter, reverse letters, double letters, may also create a string that has too a short distance to the correct spelling of the intended identifier. Also, practical culture knowledge can be used. e.g., "James"

and "Jim" can be cluster together, as they may very likely be the same name. The common errors, once detected, are deemed to be the same identifier as the correct/original identifier. In another embodiment, a match between the identifier and each of one or more existing identifiers is determined for determining the uniqueness of the identifier.

If the identifier is determined as not unique at 1050, then the process returns to 1030 and repeats (soliciting a new peripheral name from the person) until it is determined that the new identifier is unique. Then at 1060, the peripheral name is associated with the person. At 1070, the identifier is also associated with the person. The identifier may also be associated with a globally unique digital identifier (GUID) that is bound to the person in the identity management system (e.g., the OneStop identity service provider 140).

Figure 11:
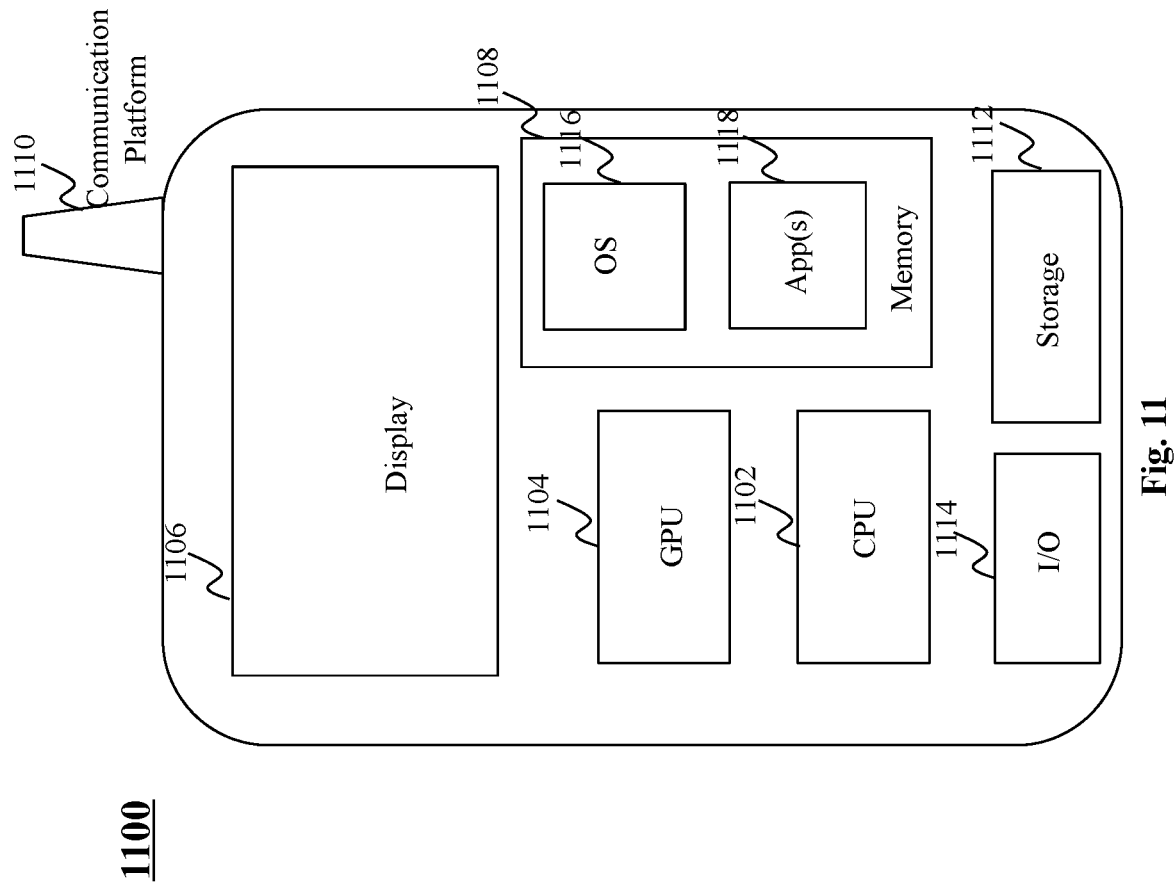
FIG. 11 depicts the architecture of a mobile device which can be used to implement a specialized system incorporating the present teaching.

FIG. 11 depicts the architecture of a mobile device which can be used to realize a specialized system implementing the present teaching. In this example, the user device by which end users could use for accessing the trusted applications 130, the OneStop identity service provider 140, and/or the credential service agents 150 is a mobile device 1000, including but is not limited to, a smart phone, a tablet, a music player, a hand-held gaming console, a global positioning system (GPS) receiver, and a wearable computing device (e.g., eyeglasses, wrist watch, etc.), or in any other form. The mobile device 1100 in this example includes one or more central processing units (CPUs) 1102, one or more graphic processing units (GPUs) 1104, a display 1106, a memory 1108, a communication platform 1110, such as a wireless communication module, storage 1112, and one or more input/output (I/O) devices 1114. Any other suitable component, such as but not limited to a system bus or a controller (not shown), may also be included in the mobile device 1100. As shown in FIG. 11, a mobile operating system 1116, e.g., iOS, Android, Windows Phone, etc., and one or more local client applications 1118 may be loaded into the memory 1108 from the storage 1112 in order to be executed by the CPU 1102. The local client applications 1118 may include a browser or any other suitable mobile apps for accessing the trusted applications 130, the OneStop identity service provider 140, and/or the credential service agents 150 on the mobile device 1100. Execution of the local client applications 1118 may cause the mobile device 1100 to perform the processing as described above in the present teaching. For example, the display of the user interfaces shown in FIGS. 2-*a*. 2-*b*, 6-*d*, and 7 may be made by the GPU 1104 in conjunction with the display 1106. User interactions with the user interfaces shown in FIGS. 2-*a*. 2-*b*, 6-*d*, and 7 may be achieved via the I/O devices 1114 and provided to the trusted applications 130, the OneStop identity service provider 140, and/or the credential service agents 150 via the communication platform 1110.

To implement the present teaching, computer hardware platforms may be used as the hardware platform(s) for one or more of the elements described herein (e.g., the OneStop identity service provider 140, the credential exchange 146, and/or the credential service agents 150, and/or other components of the system 100 with respect to FIGS. 1-10). The hardware elements, operating systems, and programming languages of such computers are conventional in nature, and it is presumed that those skilled in the art are adequately familiar therewith to adapt those technologies to implement the processing essentially as described herein. A computer with user interface elements may be used to implement a personal computer (PC) or other type of work station or terminal device, although a computer may also act as a server if appropriately programmed. It is believed that those skilled in the art are familiar with the structure, programming, and general operation of such computer equipment and as a result the drawings should be self-explanatory.

Figure 12:
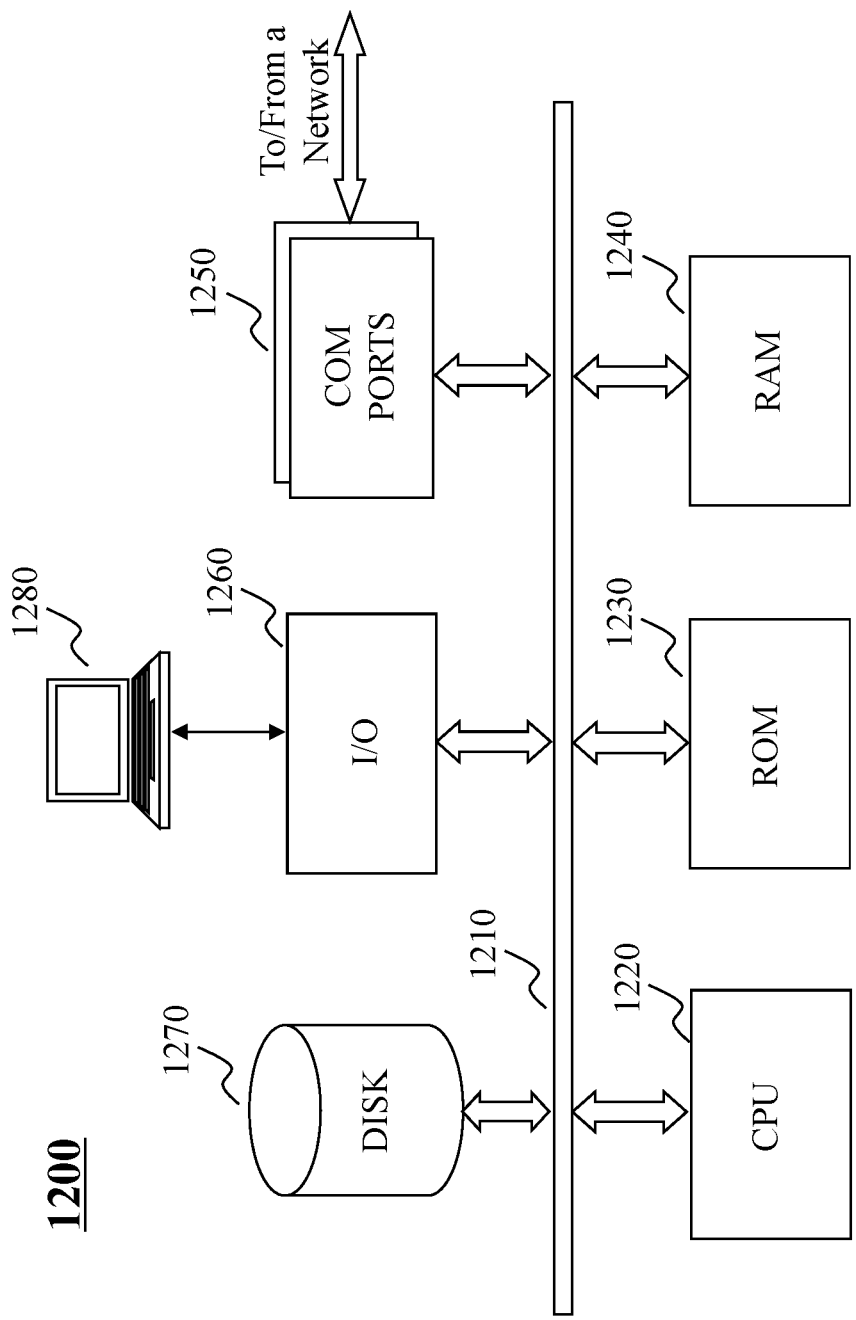
FIG. 12 depicts the architecture of a computer which can be used to implement a specialized system incorporating the present teaching.

FIG. 12 depicts the architecture of a computing device which can be used to realize a specialized system implementing the present teaching. The computer may be a general-purpose computer or a special purpose computer. This computer 1200 can be used to implement any components of the interoperable identity and interoperable credentials architecture as described herein. Different components of the system in the present teaching can all be implemented on one or more computers such as computer 1200, via its hardware, software program, firmware, or a combination thereof. Although only one such computer is shown, for convenience, the computer functions relating to the target metric identification may be implemented in a distributed fashion on a number of similar platforms, to distribute the processing load.

The computer 1200, for example, includes COM ports 1250 connected to and from a network connected thereto to facilitate data communications. The computer 1200 also includes a central processing unit (CPU) 1220, in the form of one or more processors, for executing program instructions. The exemplary computer platform includes an internal communication bus 1210, program storage and data storage of different forms, e.g., disk 1270, read only memory (ROM) 1230, or random access memory (RAM) 1240, for various data files to be processed and/or communicated by the computer, as well as possibly program instructions to be executed by the CPU 1220. The computer 1200 also includes an I/O component 1260, supporting input/output flows between the computer and other components therein such as user interface elements 1280. The computer 1200 may also receive programming and data via network communications.

Hence, aspects of the method of interoperable identity and interoperable credentials, as outlined above, may be embodied in programming. Program aspects of the technology may be thought of as "products" or "articles of manufacture" typically in the form of executable code and/or associated data that is carried on or embodied in a type of machine-readable medium. Tangible non-transitory "storage" type media include any or all of the memory or other storage for the computers, processors or the like, or associated modules thereof, such as various semiconductor memories, tape drives, disk drives and the like, which may provide storage at any time for the software programming.

All or portions of the software may at times be communicated through a network such as the Internet or various other telecommunication networks. Such communications, for example, may enable loading of the software from one computer or processor into another, for example, from a management server or host computer of the search engine operator or other explanation generation service provider into the hardware platform(s) of a computing environment or other system implementing a computing environment or similar functionalities in connection with generating explanations based on user inquiries. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to tangible "storage" media, terms such as computer or machine "readable medium" refer to any medium that participates in providing instructions to a processor for execution.

Hence, a machine-readable medium may take many forms, including but not limited to, a tangible storage medium, a carrier wave medium or physical transmission medium. Non-volatile storage media include, for example, optical or magnetic disks, such as any of the storage devices in any computer(s) or the like, which may be used to implement the system or any of its components as shown in the drawings. Volatile storage media include dynamic memory, such as a main memory of such a computer platform. Tangible transmission media include coaxial cables; copper wire and fiber optics, including the wires that form a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Those skilled in the art will recognize that the present teachings are amenable to a variety of modifications and/or enhancements. For example, although the implementation of various components described above may be embodied in a hardware device, it can also be implemented as a software only solution—e.g., an installation on an existing server. In addition, the dynamic relation/event detector and its components as disclosed herein can be implemented as a firmware, firmware/software combination, firmware/hardware combination, or a hardware/firmware/software combination.

While the foregoing has described what are considered to constitute the present teachings and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications, and variations that fall within the true scope of the present teachings.

We claim:

1. A method comprising:
storing a plurality of credentials associated with a globally unique identifier (GUID) bound to a person, each of the plurality of credentials being stored with a respective level of assurance and being associated with a respective credential service agent;
receiving a credential request from an application, the credential request including an identity assertion and a requested level of assurance;
determining a set of credentials from the plurality of credentials, the set of credentials including credentials with a respective level of assurance that is equal to or higher than the requested level of assurance and having a GUID matching the identity assertion; and
providing a user interface in response to the credential request that displays the set of credentials so that each credential in the set of credentials is selectable by a user, wherein the application uses the respective credential service agent to authenticate a user-selected credential from the set of credentials before allowing access to the application, wherein the respective credential service agent is independent of the application.

2. The method of claim 1, wherein the application lacks an associated credential.

3. The method of claim 1 wherein the identity assertion is a universal name.

4. The method of claim 3 wherein the universal name is a concatenation of a given name, a special character, and a chosen name.

5. The method of claim 1, further comprising:
determining none of the plurality of credentials with a GUID matching the identity assertion have a level of assurance equal to or higher than the requested level;
activating an identity proofing process that has a level of assurance matching the requested level of assurance, wherein success of the identity proofing process results in a credential with the requested level of assurance; and
providing the credential with the requested level of assurance as the set of credentials.

6. The method of claim 5, wherein the credential with the requested level of assurance is one of the plurality of credentials and the method further includes updating the respective level of assurance with the requested level of assurance responsive to the success of the identity proofing process.

7. The method of claim 1, wherein the respective credential service agent performs an authentication process to authenticate the user-selected credential and provides an authentication response to the application.

8. The method of claim 1, wherein the application has an associated credential and the user-selected credential differs from the associated credential.

9. The method of claim 1, wherein the plurality of credentials include a password, a passphrase, a personal identification number (PIN), a finger print, a voice sample, a retinal scan, a smart card, a hard token, a USB device, or a public key certificate.

10. A method implemented on a computing device having at least one processor, storage, and a communication platform capable of making a connection to a network for managing identity information of a person, the method comprising the steps of:
associating a globally unique identifier (GUID) with a first credential that is associated with a person, wherein the first credential is verifiable by a first credential verification service agent at a first level of assurance (LOA);
associating the GUID with a second credential that is associated with the person, wherein the second credential is verifiable by a second credential verification service agent at a second LOA, the second LOA being a higher LOA than the first LOA;
receiving an identity assertion from an application, the identity assertion specifying a requested LOA and resolving to the GUID;
identifying the first credential and the second credential as associated with the GUID;
determining whether the second LOA meets or exceeds the requested LOA and whether the first LOA meets or exceeds the requested LOA;

providing the second credential and the first credential as a verification option responsive to determining that the second LOA meets or exceeds the requested LOA and the first LOA meets or exceeds the requested LOA; and providing the second credential as a verification option responsive to determining that the second LOA meets or exceeds the requested LOA and the first LOA does not meet the requested LOA, wherein the application is enabled to initiate verification of the second credential through the second credential verification service agent and initiate verification of the first credential through the first credential verification service agent.

11. The method of claim 10, wherein associating the GUID with the first credential occurs at an identity center or at a credential exchange.

12. The method of claim 11, wherein an identity of the person is unknown to the credential exchange.

13. The method of claim 10, wherein an identity of the person has been proved by an identity proofing (IDP) source at an IDP LOA that is equal to or higher than the first LOA.

14. The method of claim 13, wherein the IDP source includes at least one of:
   an identity proofing service provider that is an approved member of a trust framework;
   government agency;
   a trusted healthcare organization; or
   a trusted application wherein users of the trusted application passed an identity proofing process at the first LOA.

15. The method of claim 10, further comprising:
   obtaining a chosen name and a given name of the person;
   generating a universal name from a combination of the given name and the chosen name; and
   associating the universal name with the GUID.

16. The method of claim 15, further comprising:
   receiving the universal name with the identity assertion; and
   using the universal name to resolve the identity assertion to the GUID.

17. The method of claim 10, further comprising:
   receiving a selection of the second credential;
   obtaining verification information from the person;
   providing the verification information to the second credential verification service agent;
   receiving a verification response from the second credential verification service agent; and
   providing the verification response to the application.

18. The method of claim 10, wherein the first credential and the second credential are not tied to the application.

19. The method of claim 10, wherein a LOA for a person's credential represents a degree to which a relying party can be assured that the person's credential represents the person.

20. A system comprising:
   at least one processor;
   memory storing a plurality of credentials, each of the plurality of credentials being associated with a globally unique identifier (GUID) corresponding to a person, and each of the plurality of credentials being stored with a respective level of assurance; and
   memory storing instructions that, when executed by the at least one processor, causes the system to perform operations including:
      receiving a credential request from an application, the credential request including an identity assertion and a requested level of assurance,
      determining a set of credentials from the plurality of credentials, the set of credentials including credentials with a respective level of assurance that is equal to or higher than the requested level of assurance and having a GUID matching the identity assertion,
      providing a user interface in response to the credential request that displays the set of credentials so that each credential in the set of credentials is selectable by a user, and
      responsive to selection of a credential from the set of credentials, using the credential in an authentication process before allowing access to the application, wherein the authentication process is associated with a credential service agent that is independent of the application.

* * * * *